US006233014B1

United States Patent
Ochi et al.

(10) Patent No.: US 6,233,014 B1
(45) Date of Patent: May 15, 2001

(54) LINE SENSOR CAMERA WITHOUT DISTORTION IN PHOTO IMAGE

(75) Inventors: Keizou Ochi, Takatsuki; Hideaki Nakanishi, Ibaraki; Takashi Kondo, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/843,341

(22) Filed: Apr. 15, 1997

(30) Foreign Application Priority Data

Apr. 17, 1996 (JP) .................................................. 8-095141
Apr. 22, 1996 (JP) .................................................. 8-099919

(51) Int. Cl.$^7$ ..................................................... H04N 3/14
(52) U.S. Cl. ........................... 348/324; 348/195; 358/497; 358/483
(58) Field of Search .................................... 348/209, 195, 348/201, 202, 203, 216, 324; 250/234, 235, 236; 358/497, 494, 481, 483, 486, 412

(56) References Cited

U.S. PATENT DOCUMENTS

| | | | |
|---|---|---|---|
| 3,642,343 | * 2/1972 | Tchejeyan et al. | 348/203 |
| 3,912,927 | * 10/1975 | Hoffman | 250/234 |
| 4,245,240 | * 1/1981 | Tanaka | 348/324 |
| 4,266,252 | * 5/1981 | Cox et al. | 348/202 |
| 4,453,087 | * 6/1984 | Linick | 250/234 |
| 4,712,142 | * 12/1987 | Tomita et al. | 348/324 |
| 4,919,499 | * 4/1990 | Aiba | 359/214 |
| 5,132,810 | * 7/1992 | kishida | 358/451 |
| 5,253,085 | * 10/1993 | Maruo et al. | 358/481 |
| 5,610,730 | * 3/1997 | Osipchuk | 348/203 |

FOREIGN PATENT DOCUMENTS

| | | |
|---|---|---|
| 62047278A | 2/1987 | (JP) . |
| 04203915A | 7/1992 | (JP) . |

* cited by examiner

*Primary Examiner*—Wendy R. Garber
*Assistant Examiner*—Alicia M. Harrington
(74) *Attorney, Agent, or Firm*—Burns, Doane, Swecker & Mathis, LLP

(57) ABSTRACT

A camera shoots an image of a two-dimensional object by a line sensor for main scanning and a rotation scanning mechanism for secondary scanning. The image pickup angle range in the secondary scanning direction is altered according to modification of the focal length of the objective lens by a zooming mechanism. The angular velocity of secondary scanning is altered according to the angular position of subscanning and the focal length so that the image pickup range on the object plane of one line is substantially equal over the entire area of the image pickup angle range. Thus, a line sensor camera is provided that can photograph an image with no distortion in the secondary scanning direction.

24 Claims, 20 Drawing Sheets

(TELE)

(WIDE)

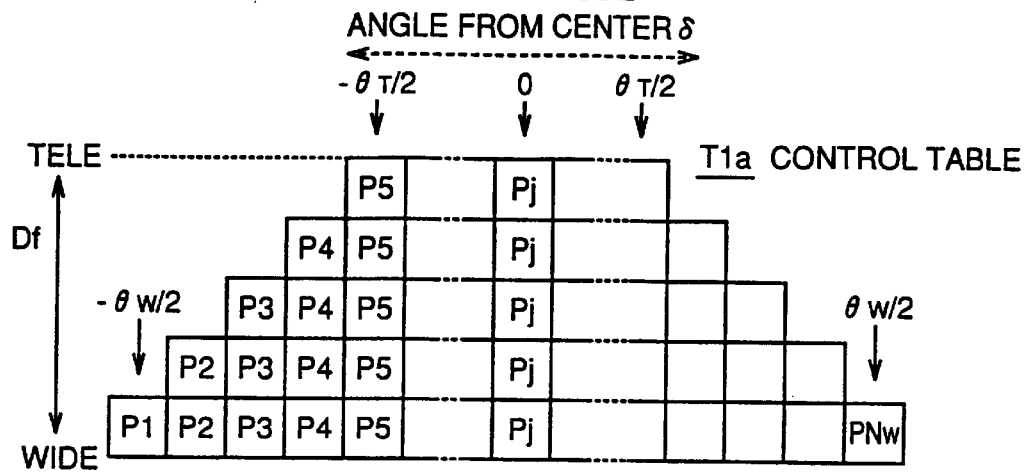
FIG.7A EXPOSURE CONTROL PRIORITY MODE /NUMBER OF LINES PRIORITY MODE
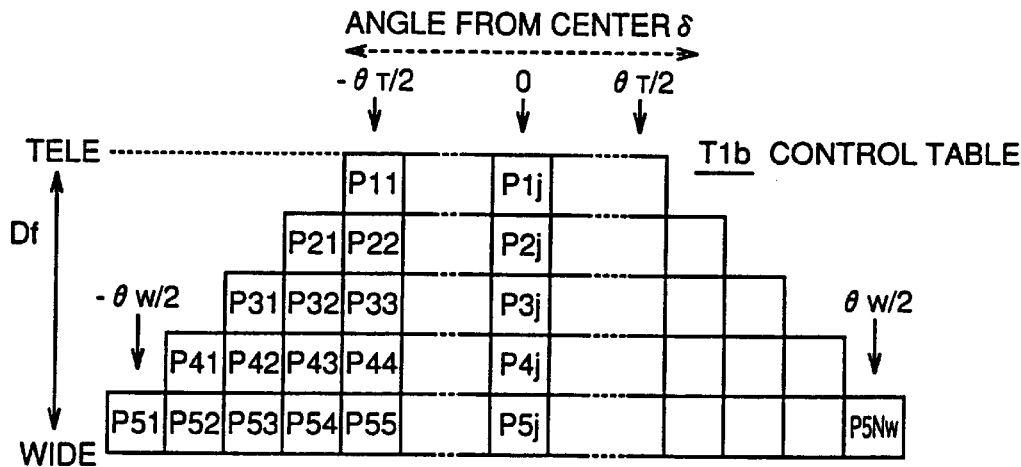
FIG.7B BLUR PREVENTION PRIORITY MODE (TELE)

(WIDE)

*FIG.21A* EXPOSURE CONTROL PRIORITY MODE

|  | \tLINE NUMBER | | | | | | |
|---|---|---|---|---|---|---|---|
|  | 1 | 2 | 3 | 4 | | j | $N_T$ |
| TELE | $P_{11}$ | $P_{12}$ | $P_{13}$ | $P_{14}$ | | $P_{1j}$ | $P_{1N_T}$ |
|  | $P_{21}$ | $P_{22}$ | $P_{23}$ | $P_{24}$ | | $P_{2j}$ | $P_{2N_T}$ |
| Df | $P_{31}$ | $P_{32}$ | $P_{33}$ | $P_{34}$ | | $P_{3j}$ | $P_{3N_T}$ |
|  | $P_{41}$ | $P_{42}$ | $P_{43}$ | $P_{44}$ | | $P_{4j}$ | $P_{4N_T}$ |
|  | $P_{51}$ | $P_{52}$ | $P_{53}$ | $P_{54}$ | | $P_{5j}$ | $P_{5N_T}$ |
| WIDE | | | | | | | |

T1a

*FIG.21B* BLUR PREVENTION PRIORITY MODE

|  | LINE NUMBER | | | | | | |
|---|---|---|---|---|---|---|---|
|  | 1 | 2 | 3 | 4 | | j | $N_T$ |
| TELE | P1 | P2 | P3 | P4 | | Pj | $P_{N_T}$ |
|  | P1 | P2 | P3 | P4 | | Pj | $P_{N_T}$ |
| Df | P1 | P2 | P3 | P4 | | Pj | $P_{N_T}$ |
|  | P1 | P2 | P3 | P4 | | Pj | $P_{N_T}$ |
|  | P1 | P2 | P3 | P4 | | Pj | $P_{N_T}$ |
| WIDE | | | | | | | |

T1b

*FIG.21C* NUMBER OF LINES PRIORITY MODE

|  | LINE NUMBER → | | | | 1 | | j | | $N_T$ | |
|---|---|---|---|---|---|---|---|---|---|---|
| TELE | | | | | P5 | | Pj | | | |
|  | | | | P4 | P5 | | Pj | | | |
| Df | | | P3 | P4 | P5 | | Pj | | | |
|  | | P2 | P3 | P4 | P5 | | Pj | | | Nw |
|  | P1 | P2 | P3 | P4 | P5 | | Pj | | | $P_{N_w}$ |
| WIDE | | | | | | | | | | |

T1c

LINE SENSOR CAMERA WITHOUT DISTORTION IN PHOTO IMAGE

BACKGROUND OF THE INVENTION

1. Field of the Invention

The present invention relates to a line sensor camera that shoots a two dimensional image by means of a line sensor (a one dimensional image pickup device).

2. Description of the Related Art

A digital camera that effects shooting using a combination of a line sensor and a scanning mechanism such as a mirror rotation mechanism has been conventionally proposed (Japanese Patent Publication No. 4-67836). This type of digital camera is called a line sensor camera. A line sensor camera has the advantage of allowing shooting at a resolution higher than that of a digital camera that employs an area sensor. The entire page of a document of approximately A4 in size, for example, can be photographed at a level where regular-sized characters on the page can be read.

In a line sensor camera, the scanning rate on the plane of the object to be taken varies depending on the image pickup angular position when the scanning mechanism rotates uniformly. Referring to FIG. 18, the image pickup distance d2 per unit time at the edge area of object plane S1 is greater than the image pickup distance d1 per unit time at the center area. The photo image will result in a distorted image where the edge portion of the object is compressed.

As conventional methods to eliminate such image distortion inherent to rotation scanning, the method of scanning object plane S1 at uniform speed optically using a fθ lens, and the method of varying the rotary speed of the motor for scanning according to the image pickup angular position of secondary scanning (Japanese Patent Laying-Open No. 4-203915) are known. The former is not applicable to a handy-type camera since it is difficult to fabricate a fθ lens that is small, light, and bright. Furthermore, in the structure where the light of the object always passes through the optical axis (center) of the lens, correction using the fθ lens cannot be effected since the θ does not change.

In such a line sensor camera, the degree of freedom in framing is increased to improve user's convenience by incorporating a zoom unit as the lens system for projection. However, in a line sensor camera of a structure in which the optical axis of the lens system moves relative to the object to be photographed in conjunction with secondary scanning such as a line sensor camera in which the mirror for secondary scanning is located in front of the lens system, there is a problem that the aspect ratio of the object image (photo image) on the image pickup surface of the line sensor is altered when the focal length of the lens system changes according to a zooming operation, i.e. when the image magnification changes. It was necessary to alter the image pickup range of the secondary scanning direction according to the focal length. Furthermore, there is a case where the image pickup range in the secondary scanning direction, not the main scanning direction, is altered to achieve the effect of panoramatic shooting. In such cases where the image pickup range has to be altered, the scanning rate must be increased to restrict the image pickup time period for the purpose of reducing the effect of camera-shaking when the image pickup range is expanded. In other words, the scanning rate must be controlled in response to change in the image pickup range.

The aforementioned method of employing a fθ lens is not applicable to a portable camera. Fabrication of a clear fθ lens that is small in size and weight and that allows zooming is extremely difficult. In the case of a structure where the mirror for scanning is arranged in front of the lens, the fθ lens cannot be used since the θ cannot be altered due to the light of the object always passing through the optical axis (center) of the lens.

The method of changing the rotary speed of the motor is disadvantageous in that the rotary speed cannot be controlled critically in comparison to the control where the rotary speed is maintained at a constant level during shooting.

SUMMARY OF THE INVENTION

In view of the foregoing, an object of the present invention is to prevent distortion in a photo image in a line sensor camera.

Another object of the present invention is to obtain a proper photo image even when the image pickup range in the secondary scanning direction is altered in a line sensor camera.

A further object of the present invention is to prevent distortion in a photo image without using any particular optical component in a line sensor camera, and without depending upon control by a mechanical movable unit.

According to an aspect of the present invention, a camera includes a photographic lens, a line sensor for scanning in a main scanning direction an image of an object taken by the photographic lens, a rotation scanning unit for scanning in a secondary scanning direction the image of the object taken by the photographic lens, a modifier for modifying the focal length of the photographic lens, an image pickup range modifier for modifying the image pickup range in the secondary scanning direction according to the focal length of the photographic lens, and a secondary scanning speed modify unit for altering the angular velocity of secondary scanning according to the angle of secondary scanning and the focal length so that the image pickup range of one line in the line sensor is equal over the entire area of the image pickup range.

In a camera employing a line sensor, the object is scanned at uniform speed since the angular velocity of secondary scanning is altered according to the angle of secondary scanning and the focal length so that the image pickup range of one line is equal over the entire area of the image pickup range. As a result, a line sensor camera having distortion in the photo image suppressed can be provided.

According to another aspect of the present invention, a camera includes a photographic lens, a line sensor for scanning in a main scanning direction an image of an object taken by the photographic lens, a rotation scanning unit for scanning in a secondary scanning direction the image of the object taken by the photographic lens, a drive unit that rotates at uniform speed to drive the rotation scanning unit, and a drive transmission unit for altering and transmitting to the rotation scanning unit the uniform rotation of the drive unit according to the angle of the secondary scanning.

The uniform rotation of the drive unit is altered according to the angle of secondary scanning so that the image pickup range of one line is equal over the entire area of the image pickup range. As a result, a camera employing a line sensor having distortion in the photo image suppressed can be provided.

According to a further aspect of the present invention, a camera includes a line sensor for scanning in a main scanning direction an image of an object taken by a photographic lens, a rotation scanning unit for scanning the image of the object in a secondary scanning direction, an image pickup range modify unit for modifying the image pickup range in the scanning direction, and a secondary scanning speed modify unit for altering the angular velocity of secondary scanning according to the angle of secondary scanning and the focal length so that the image pickup range of one line in the line sensor is equal over the entire area of the image pickup range.

According to still another aspect of the present invention, a camera includes a photographic lens, a line sensor for scanning in a main scanning direction an object taken by the photographic lens, a rotation scanning unit for scanning in a secondary scanning direction the image of the object taken by the photographic lens, and an image pickup control unit for altering the cycle of image pickup of secondary scanning according to the angle of secondary scanning so that the image pickup range of one line is equal over the entire area of the image pickup range.

The angular velocity and the image pickup cycle of secondary scanning are modified according to the angle of secondary scanning so that the image pickup range of 1 line or the distance interval between image pickup lines are equal all over the entire area of the image pickup range. As a result, a line sensor camera can be provided that can have distortion in a photo image suppressed without using an optical component such as a fθ lens and the like, and without depending upon control of a mechanical movable unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are schematic diagrams of the data contents of a control table.

FIGS. 21A–21C are schematic diagrams of data contents of a control table.

DESCRIPTION OF THE PREFERRED EMBODIMENTS (1) First Embodiment

Figure 1:
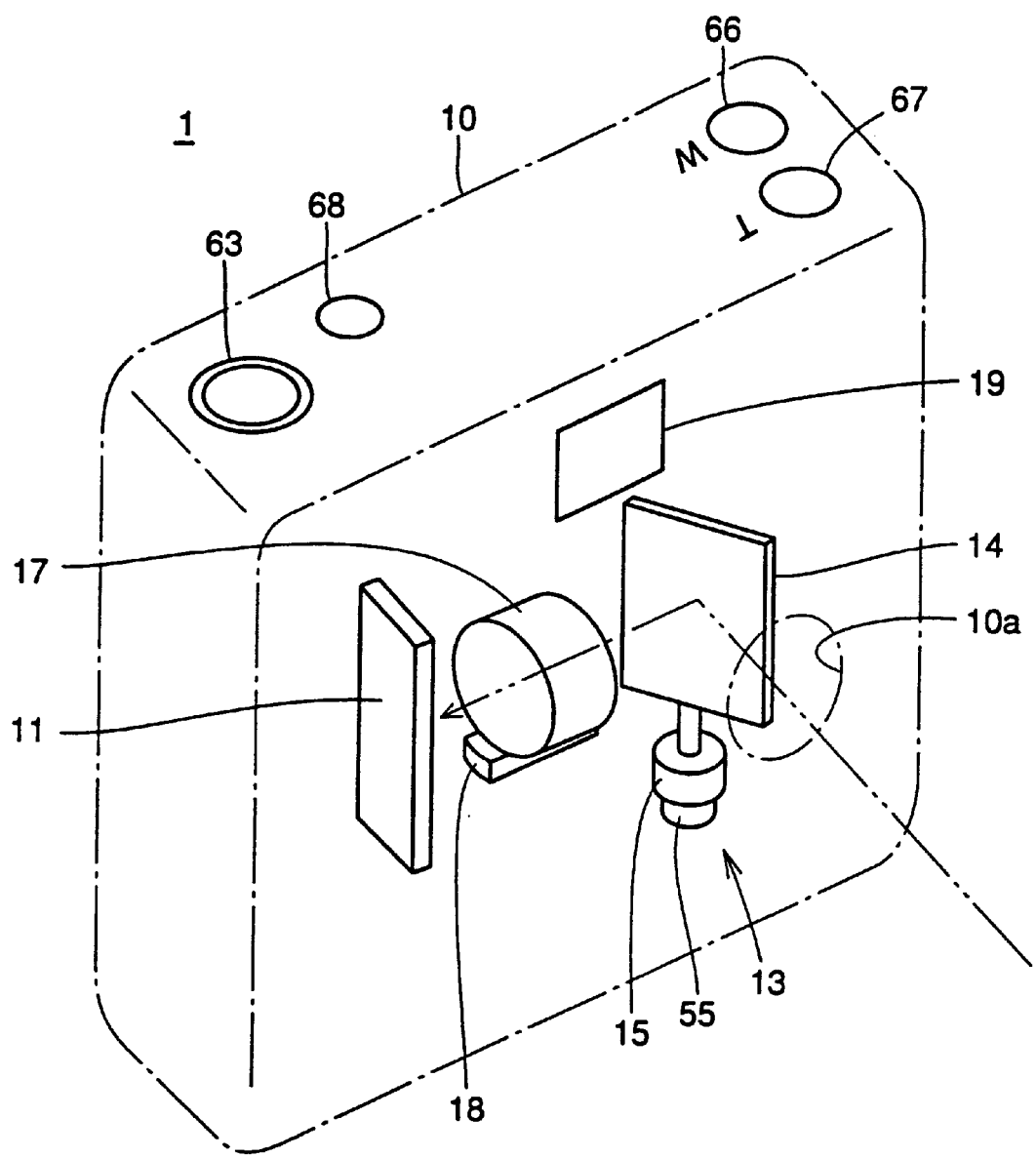
FIG. 1 shows a structure of a line sensor camera to which the present invention is applied.
Figure 2:
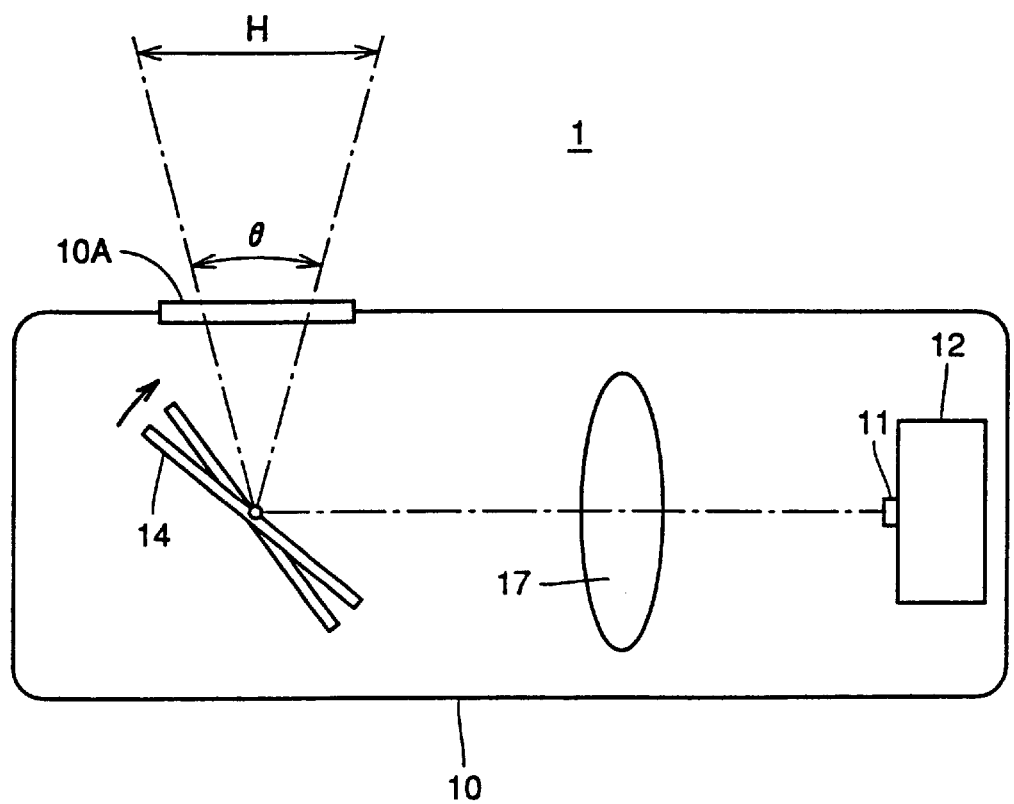
FIG. 2 is a schematic diagram showing a format of secondary scanning.

Referring to FIGS. 1 and 2, a line sensor camera 1 according to the first embodiment of the present invention is a handy type (i.e., portable) line sensor camera. A window 10a is provided at the front side of a housing 10 for guiding inside the light of an object. Protective glass 10A is embedded in window 10a. A mirror 14 is disposed at the posterior of window 10a for secondary scanning. The light of the object reflected at mirror 14 passes through a zoom unit 17 for imaging to enter a line sensor 11. By providing mirror 14 in front of (at the object side of) projecting lens system 17, the dimension of housing 10 in the thickness direction can be reduced.

Line sensor 11 is an image pickup device formed of a CCD array, fixed at a position where the image of an object is to be formed. Each pixel in line sensor 11 is arranged in the vertical direction in the drawing. Alternatively, another image pickup device (for example, a MOS type image pickup device) can be used instead of the CCD sensor as line sensor 11.

Mirror 14 is attached to the rotation shaft of a scan motor 15. This rotation shaft is parallel to the direction of the pixel alignment (main scanning direction) of line sensor 11. The image of the object is formed one line at a time on the light receiving plane of line sensor 11 according to rotation of mirror 14. In other words, the image of the object is scanned in a direction perpendicular to the main scanning direction (secondary scanning direction). A rotation sensor 55 is attached to scan motor 15 to detect the angle of rotation and speed of rotation. A line scanning mechanism 13 is formed of mirror 14, scan motor 15, and rotation sensor 55. As shown in FIG. 2, an image pickup range H (angle of view θ) in the secondary scanning direction depends upon the angle of rotation (amount of rotational movement) of mirror 14.

Zoom unit 17 is an internal focusing unit. A portion of the incident light is used for AF (Auto Focusing). An actuator (zoom drive unit) 18 to effect electric powered zooming is attached to zoom unit 17. Actuator 18 has an built-in encoder (f sensor 56) indicating the position of the zoom lens. Line sensor camera 1 has an optical finder 19.

At the top surface of housing 10, a release switch 63, a mode switch 68, and two zoom switches 66 and 67 are provided. The user can switch among the image pickup modes in a cycling manner at every depression of mode switch 68. Zooming in the wide-angle direction and the telephoto direction is effected by turning on zoom switches 66 and 67, respectively. Any operation of mode switch 68 and zoom switches 66 and 67 is disabled during the image pickup period of one screen.

Figure 3:
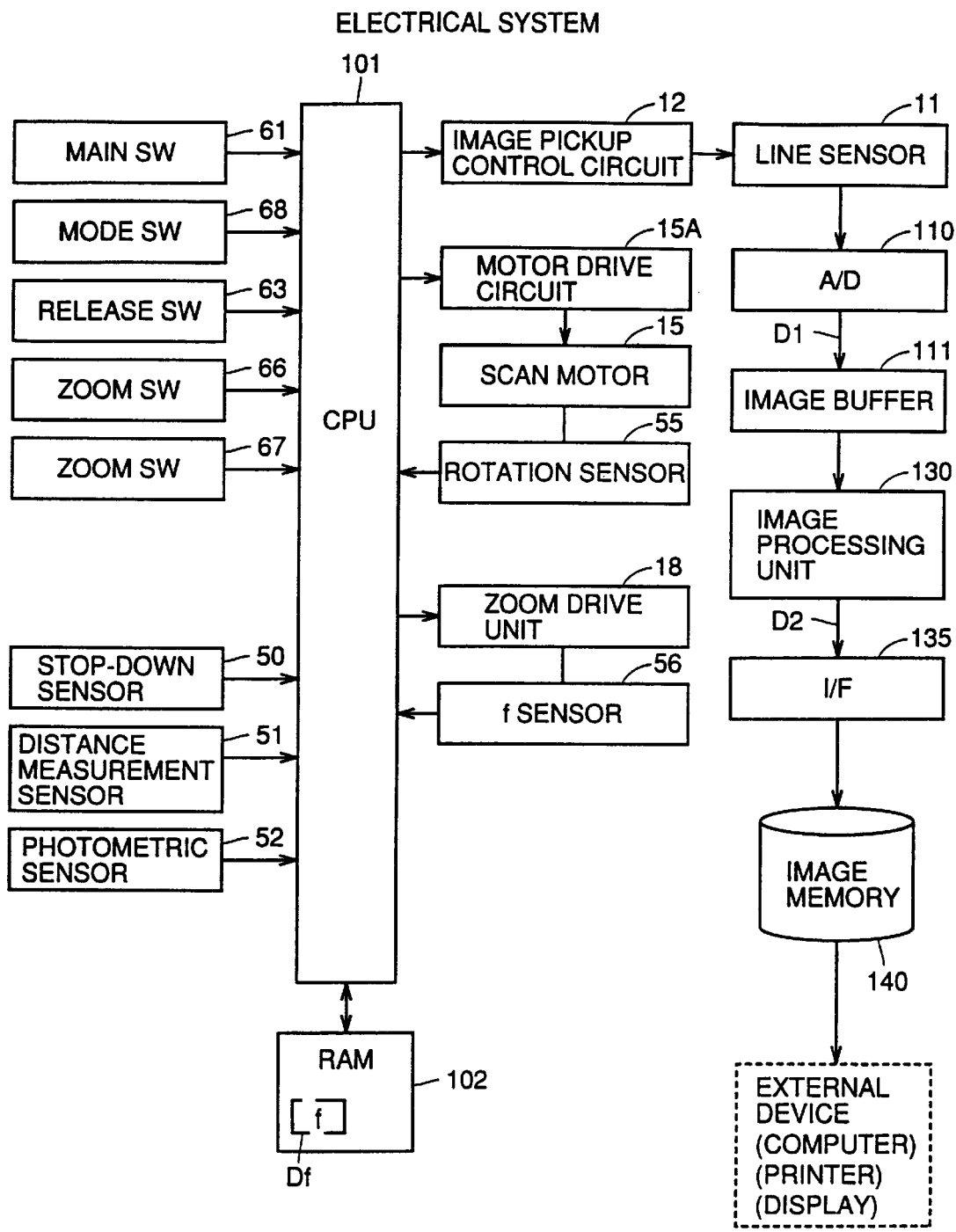
FIG. 3 is a block diagram of the electrical system of a line sensor camera.

FIG. 3 is a block diagram of the electrical system of line sensor camera 1.

The electrical system is formed centering about a CPU 101 that provides the overall control. The output signals of various switches including a main switch 61 and various sensors such as a rotation sensor 55, a focal length sensor 56, a distance measurement sensor 51 and the like are applied to CPU 101. CPU 101 detects the rotation angle and rotation speed of scan motor 15 by the output signal of rotation sensor 55 to provide an appropriate instruction to a motor drive circuit 15A so that the image of the object is scanned at a predetermined rate. CPU 101 also carries out a process of adjusting the image pickup range H (FIG. 2) of the secondary scanning direction according to increase/decrease of the projection magnification so that the aspect ratio of the photo image is maintained at a constant level independent of the zooming condition. More specifically, determination is made at which angular position of mirror 14 the image pickup is to be commenced, and the values of the control parameters such as the scanning time of 1 line (line cycle ΔT), rotation speed ω of mirror 14, number of lines N, and the like are set. A RAM 102 which is a work area for executing a program by CPU 101 is used for temporary storing focal length data Df that varies according to zooming.

Image pickup control circuit 12 initiates control of line sensor 11 in response to a start signal from CPU 101, and provides a shift gate signal that defines the end timing of integration (charge storage) of the CCD to line sensor 11. Line sensor 11 latches the photoelectric conversion signal of each pixel according to the shift gate signal, and provides the signals to an A/D conversion unit 110 in the sequence of pixel arrangement. This main scanning is repeated for every line cycle ΔT.

A/D conversion unit 110 converts a photoelectric conversion signal from line sensor 11 into image pickup data D1 of a predetermined number of bits (for example, 8 bits) in synchronization with a pixel clock. Image pickup data D1 is first stored in an image buffer 111 as the actual object information taken by line sensor camera 1, and then transferred to an image processing unit 130. Image processing unit 130 applies a digital signal process required for improving picture quality and the like on image pickup data D1. The processed data is output as image data D2. Image data D2 output from image processing unit 130 is transferred to an image memory 140 via an interface 135 to be stored as image information that forms one screen. The image information is provided to an external device from image memory 140 when necessary. An external device includes an image editor device typical of a computer system, an image output device such as a printer and a display, and the like.

FIG. 4 shows the angle of view in the main scanning direction.

Figure 4A:
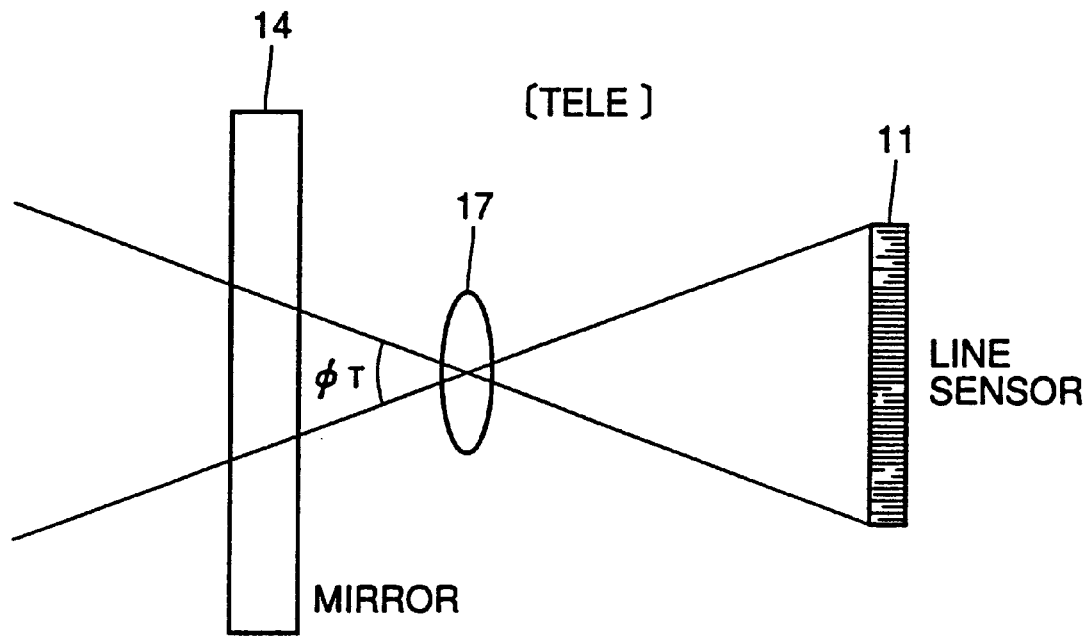
FIGS. 4A and 4B show the angle of view of the main scanning direction.
Figure 4B:
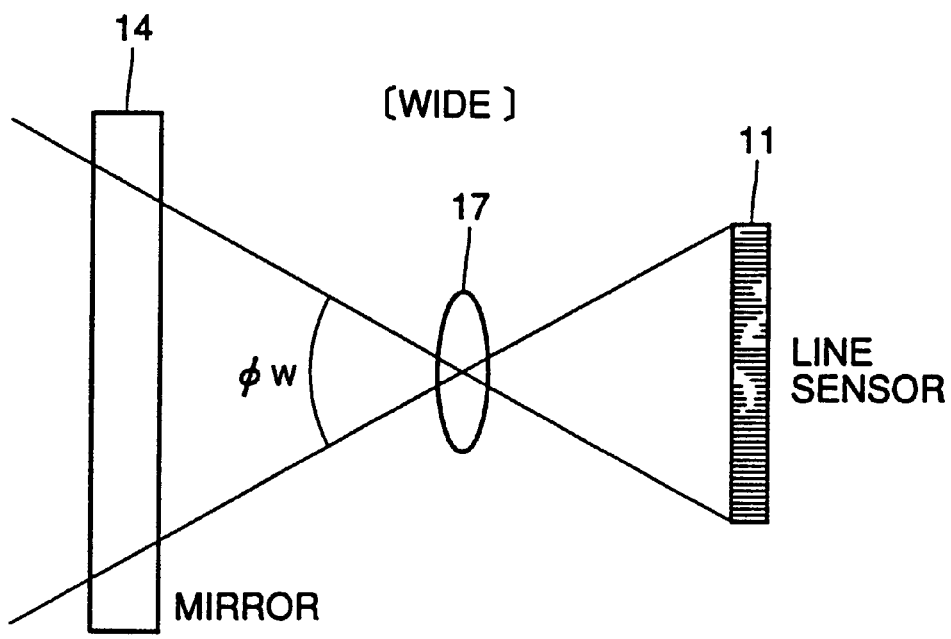

The image pickup range in the main scanning direction depends upon zooming. In the telephoto condition in which the focal length (not shown) of zoom unit 17 is great, the angle of view $\phi_T$ is small and the image magnification is large, as shown in FIG. 4A. In the wide-angle condition of FIG. 4B, the angle of view $\phi_W$ is large and the image magnification is small. The length in the main scanning direction of mirror 14 is selected so that an adequate amount of light of the object is directed to line sensor 11 with the shortest focal length of zoom unit 17.

Figure 5A:
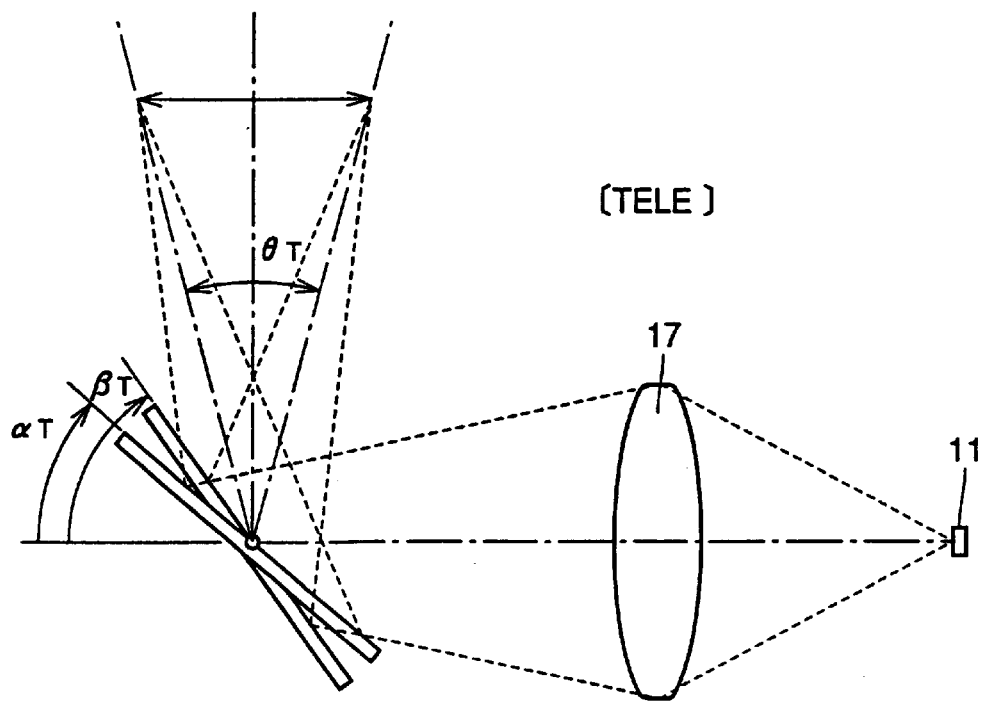
FIGS. 5A and 5B show the image pickup angle range in the secondary scanning direction.
Figure 5B:
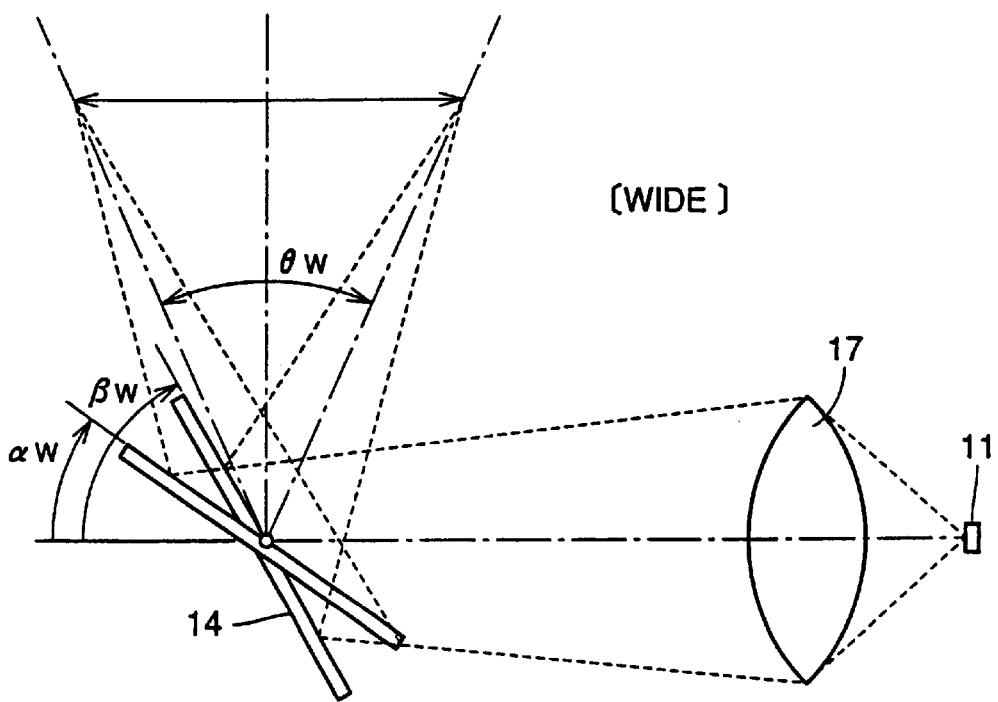

FIGS. 5A and 5B show the image pickup angle range in the secondary scanning direction.

In contrast to the image pickup range of the main scanning direction (the direction of the pixel alignment in line sensor) depending upon the focal length, the image pickup range in the secondary scanning direction depends upon the angle of rotation (swing angle) of the scanning mechanism during the image pickup period. By increasing/decreasing the angle of rotation of secondary scanning according to the change in the focal length (i.e. change in magnification), the aspect ratio of the image of the object on the image pickup surface can be made constant.

It is appreciated by comparing FIGS. 5A and 5B that scan angles $\theta_T$, $\theta_W$ which are the angles of rotation of the optical axis in scanning one screen are altered according to the zooming condition. More specifically, the scan angle $\theta_W$ in a wide-angle condition is set greater than scan angle $\theta_T$ of a telephoto condition.

The timing of beginning and ending scanning is to be adjusted appropriately in order to increase/decrease scan angles $\theta_T$ and $\theta_W$ without altering the center direction of the image pickup angle range. Referring to FIG. 5A of a telephoto condition, image pickup commences when the rotational position of mirror 14 attains a position at which the amount of displacement from the reference position is an angle $\alpha_T$ (image pickup start angle), and image pickup ends when the rotational position of mirror 14 attains a position at which the amount of displacement from the reference position is an angle $\beta_T$ (image pickup end angle). Referring to FIG. 5B of a wide-angle condition, image pickup commences when the rotational position of mirror 14 attains a position at which the amount of displacement from the reference position is an angle $\alpha_W$ which is smaller than angle $\alpha_T$, and image pickup ends when the rotational position of mirror 14 attains a position at which the amount of displacement from the reference position is an angle $\beta_W$ which is greater than angle $\beta_T$. The following relationship is established among angles $\alpha_T$, $\alpha_W$, $\beta_T$, and $\beta_W$.

$$\alpha_W < \alpha_T < \beta_T < \beta_W$$

Thus, at least one of the aforementioned three control parameters (line cycle ΔT, rotation speed ω, and number of lines N) must be altered in increasing/decreasing scan angles $\theta_T$ and $\theta_W$.

Line sensor camera 1 includes three image pickup modes differing in control parameter setting as shown in the following Table 1.

TABLE 1

| Image pickup mode | ΔT | ⊙ | N |
|---|---|---|---|
| ① Exposure control priority mode | Variable | Constant | Constant |
| ② Blur prevention priority mode | Constant | Variable | Constant |
| ③ Number of lines priority mode | Constant | Constant | Variable |

Figure 6A:
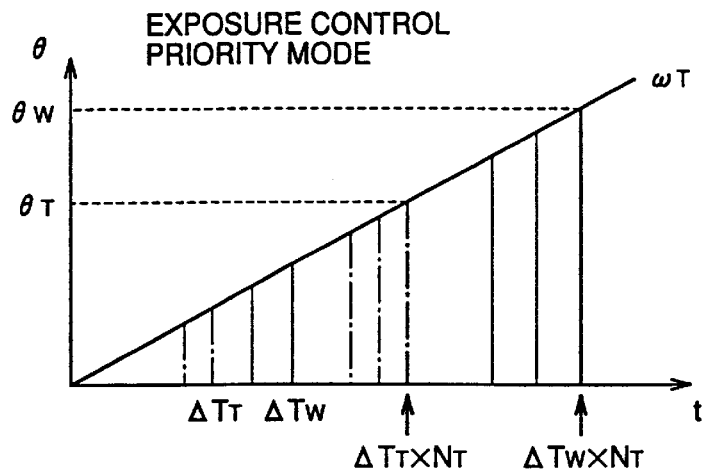
FIGS. 6A–6C are graphs for describing the operation of three image pickup modes.
Figure 6B:
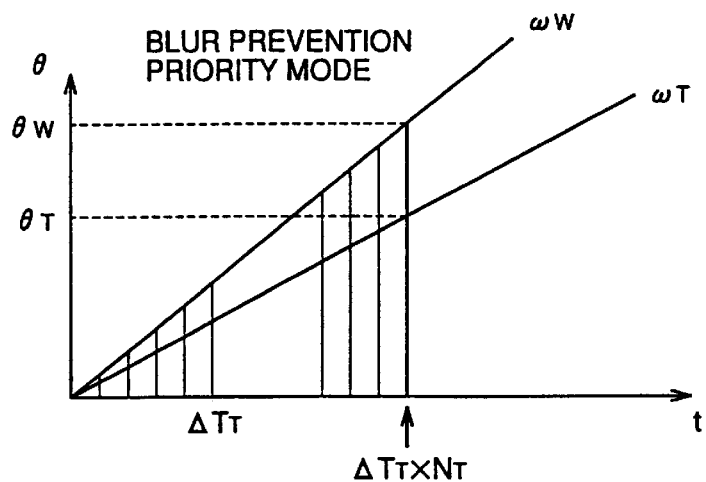

FIGS. 6A–6B are graphs for describing the operation of the three image pickup modes. The time period t required for image pickup is plotted along the abscissa, and the scan angle θ is plotted along the ordinate.

For the sake of expedience, increase/decrease of the parameter values will be described assuming that zooming is effected from the telephoto side to the wide-angle side, i.e. increasing scan angle θ. The subscript "$_T$" and the subscript "$_W$" in each parameter indicate a telephoto condition and a wide-angle condition, respectively.

Under exposure control of line sensor 11, it is desirable that line cycle ΔT is longer. This is because insufficient exposure can be avoided by setting an adequate length of the charge storage time period of the CCD.

In the exposure control priority mode shown in FIG. 6A, the line cycle is increased from $\Delta T_T$ to $\Delta T_W$ ($\Delta T_T < \Delta T_W$) to be commensurable to the increase of scan angle $\theta_T$ to $\theta_W$ ($\theta_T < \theta_W$). The rotation speed ω and the number of lines N are constant and set to values $\omega_T$ and $N_T$, respectively, in both the telephoto and wide-angle conditions. Therefore, the image pickup time period of one screen (the scanning time of $N_T$ lines) is longer in a wide-angle condition than in a telephoto condition.

A longer image pickup time period induces the probability of disturbance in the photo image (blurring) arising from camera-shaking during shooting. In the blur prevention priority mode shown in FIG. 6B, line cycle $\Delta T$ is fixed to the value of $\Delta T_T$, and the rotation speed $\omega$ is increased from $\omega_T$ to $\omega_W$ ($\omega_T < \omega_W$) in proportion to a greater scan angle $\theta$. As a result, the image pickup time period of one screen is constant independent of the zooming condition, and the probability of blurring does not increase. Rotation speed $\omega$ is modified during secondary scanning to prevent distortion in the image. Therefore, the comparison of the magnitude of rotational speed $\omega$ is based on the center position of the image pickup angle range in the secondary scanning direction, i.e. the position of the line corresponding to the exact front of line sensor camera 1.

Figure 6C:
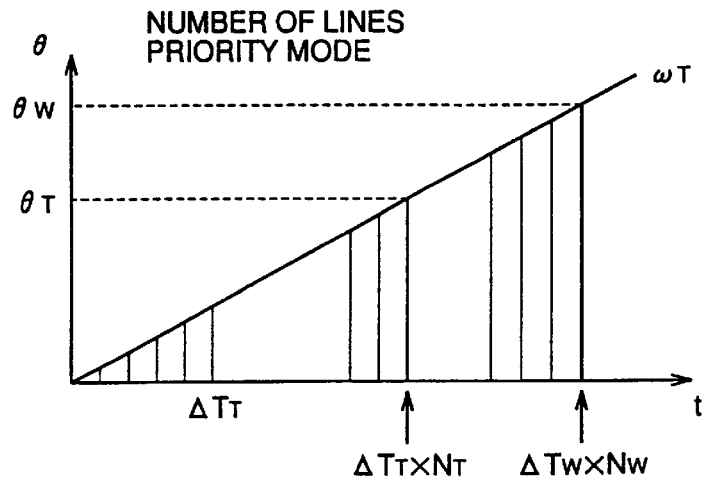

In the number of lines priority mode shown in FIG. 6C, the number of lines N is increased from $N_T$ to $N_W$ ($N_T < N_W$) to be commensurable to increase of scan angle $\theta$. The resolution in the secondary scanning direction becomes constant independent of the zooming condition. Since line cycle $\Delta T$ and rotation speed $\omega$ are constant, the image pickup time period in a wide-angle condition (=$\Delta T_T \times N_W$) is longer than the image pickup time period (=$\Delta T_T \times N_T$) of a telephoto condition.

Figure 8:
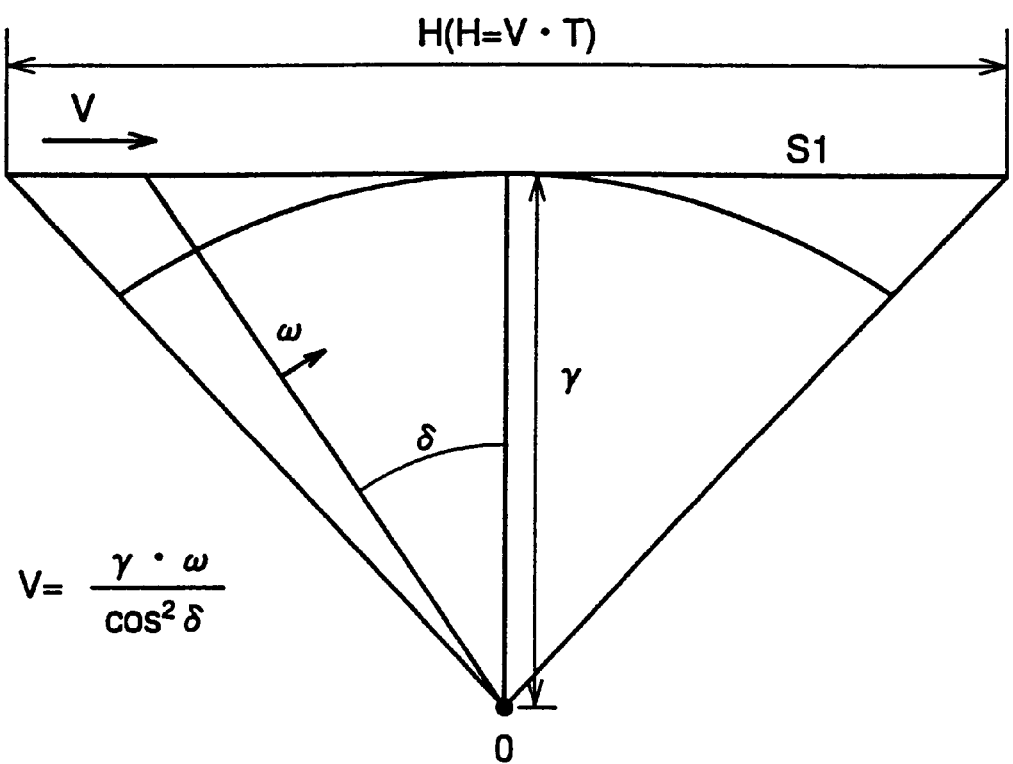
FIG. 8 is a diagram for describing a method of calculating rotation speed.

FIGS. 7A and 7B are schematic diagrams of the data content of control table T1, and FIG. 8 is a diagram for describing the method of calculating rotation speed $\omega$.

In line sensor camera 1, image distortion is suppressed by setting scanning speed V on object plane S1 constant. Therefore, the angular velocity of secondary scanning is altered under control of scan motor 15. More specifically, rotation speed $\omega$ is altered during secondary scanning according to the difference between the angle position of secondary scanning and the middle position (center) of image pickup angle range $\theta$. Control table $T_1$ is a group of control data that defines rotation speed $\omega$ at each angular position. The data content is set by CPU 101. In secondary scanning, CPU 101 specifies the angular position of the currently scanning line (angle $\delta$ from the center) and focal length data Df, and reads out the particular control data. The read out control data is transferred to motor drive circuit 15A.

In the above-described exposure control priority mode and number of lines priority mode, modification of rotation speed $\omega$ according to the zooming condition is not carried out. Therefore, control table T1a in these modes is formed of a control data group in which the value differs according to angle $\delta$ and in which the value is equal independent of focal length data Df if of the same line, as shown in FIG. 7A. In a blur prevention priority mode, rotational speed $\omega$ is modified according to the zooming condition. Therefore, control table T1b of this mode is formed of a control data group in which the value differs depending upon angle $\delta$ and in which the value also differs according to focal length data Df, as shown in FIG. 7B. Although the drawing illustrates only five stages of focal length data Df, the number of levels of focal length data Df is greater than 5, for example at least 20, in practice. Since the data values of the former half of the row of angle $\delta$ duplicate the latter half of the row of angle $\delta$, it is possible to store the data for only the former half of angle $\delta$ (the angle in the range of $-\theta_W/2 \sim 0$), for example, and apply the same data for two angular positions. As to the angular position of the last line, for example, the data of the angular position of the beginning line can be applied.

The value of control data DP of control table T1 is selected so that the secondary scanning speed V on object plane S1 is substantially constant all over the entire area of the image pickup angle range. More specifically, when the distance between rotation center O of secondary scanning and object plane S1 is r, and the angle between the center direction of the image pickup angle range to the scanning direction of a time point of interest is $\delta$, as shown in FIG. 8, scanning speed V on object plane S1 is expressed by the following equation (1).

$$V = r \times w / \cos^2 \delta \qquad (1)$$

The image pickup time period T of one screen is the product of line cycle $\Delta T$ and number of lines N [equation (2)]. Image pickup distance H of one screen on object plane S1 is a product of scanning speed V and image pickup time period T of one screen [equation (3)].

$$T = \Delta T \times N \qquad (2)$$

$$H = V \times T \qquad (3)$$

Therefore, rotation speed $\omega$ is expressed by the following equation (4).
The value of control data DP is calculated using the equation (4).

$$\omega = \frac{V \cdot \cos^2 \delta}{r} = \frac{H \cdot \cos^2 \delta}{\Delta T \cdot N \cdot r} \qquad (4)$$

Distance r is calculated according to the output of distance measurement sensor 51. Image pickup distance H is determined by distance and scan angle $\theta$ (altered according to zooming condition).

Figure 9:
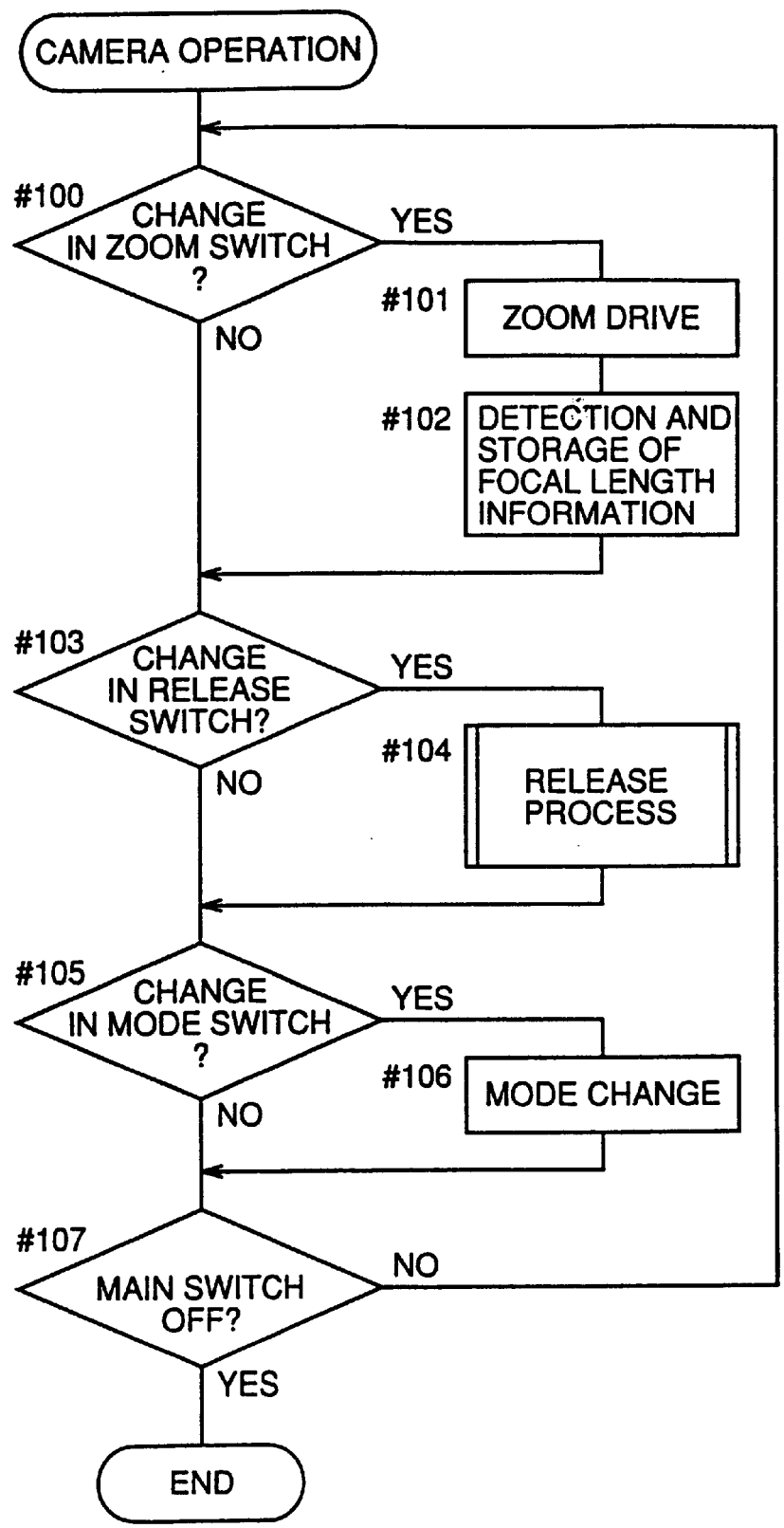
FIG. 9 is a flow chart of the operation of a camera.

FIG. 9 is a flow chart of a camera operation.

CPU 101 carries out a process according to a switch operation under the circumstance that a battery is installed, control power supply is turned on, and main switch 61 is turned on. When zoom switches 66 and 67 are turned on (#100), drive control of actuator 18 is provided (#101). Focal distance data Df corresponding to the latest position of the movable portion of zoom unit 17 is stored (#102).

When release switch 63 is turned on (#103), a release process is carried out (#104) to convert the image of the object into image data D2 and storing image data D2 in image memory 140. When mode switch 68 is turned on (#105), the image pickup mode is switched in a cyclical manner (#106). The transition of the condition of each switch is monitored until main switch 61 is turned off (#107, #100).

Figure 10:
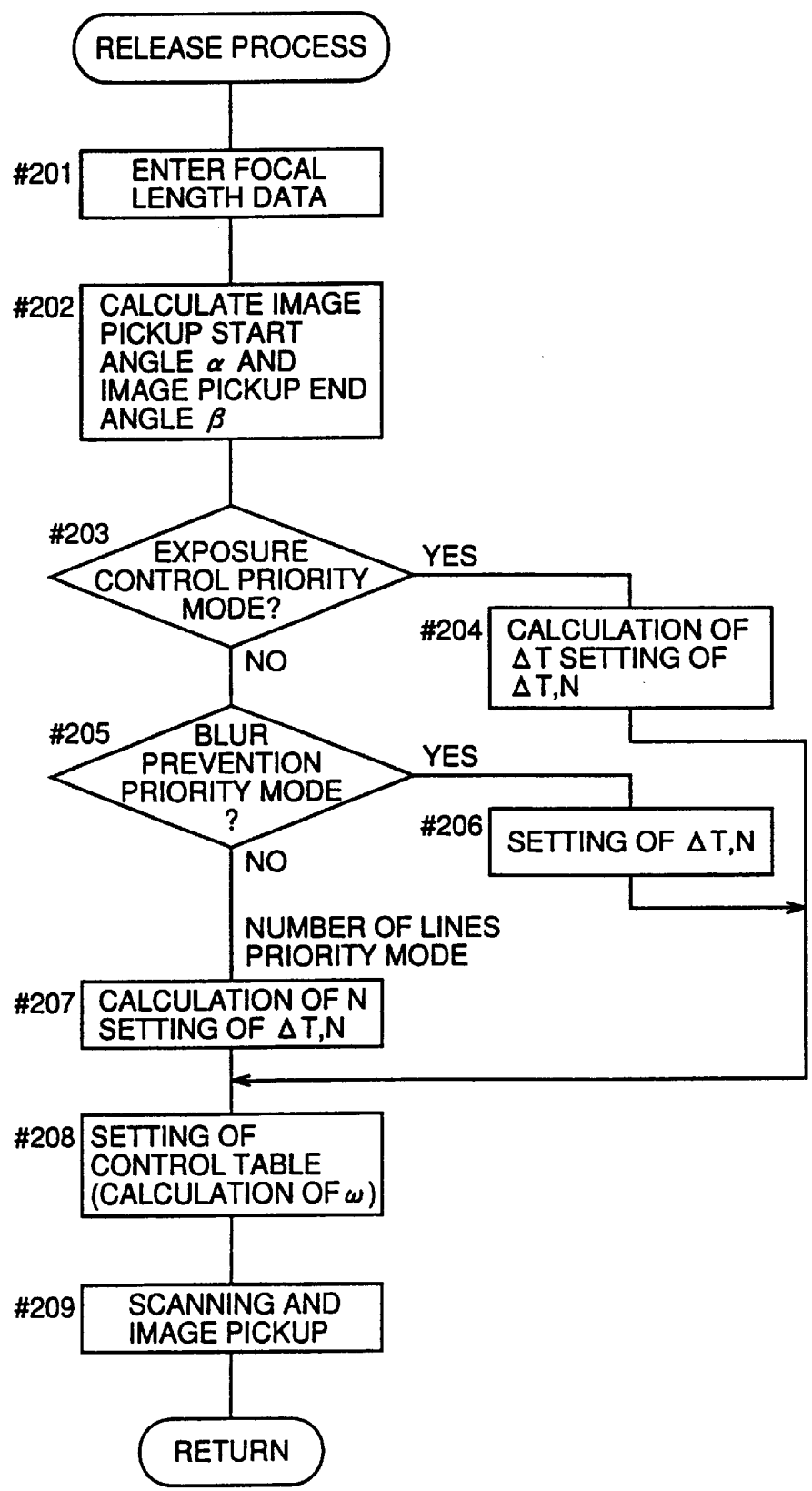
FIG. 10 is a flow chart of a release process of FIG. 9.

FIG. 10 is a flow chart of the release process of FIG. 9.

As the process of increasing/decreasing scan angle $\theta$ according to the focal length (magnification) to maintain a constant aspect ratio of the photo image, focal length data Df is entered to calculate image pickup start angle $\alpha$ and image pickup end angle $\beta$ (#201, #202).

Then, line cycle $\Delta T$ and number of lines N are set according to the image pickup mode, and the value of focal length data Df is set according to the output of f sensor 56 (#203–#207). In setting the parameter, line cycle $\Delta T$ corresponding to focal length data Df is calculated when in an exposure control priority mode, and the number of lines N corresponding to focal length data Df is calculated when in a number of lines priority mode.

Then, rotation angle ω of a predetermined angular position corresponding to focal length Df is calculated to generate control data DP, which is set in control table T1 (#208). Control data DP of each angular position is read out in the scanning order from control table T1 to pick up one screen while altering the rotation angle ω (#209). A parameter value corresponding to focal length data Df can be prestored in a ROM and the like to be read out therefrom at #203–#207. It is also possible to store control table T1 in a ROM, and read out control data according to focal length data Df to control the variable speed rotation of mirror 14.

(2) Second Embodiment

Figure 11:
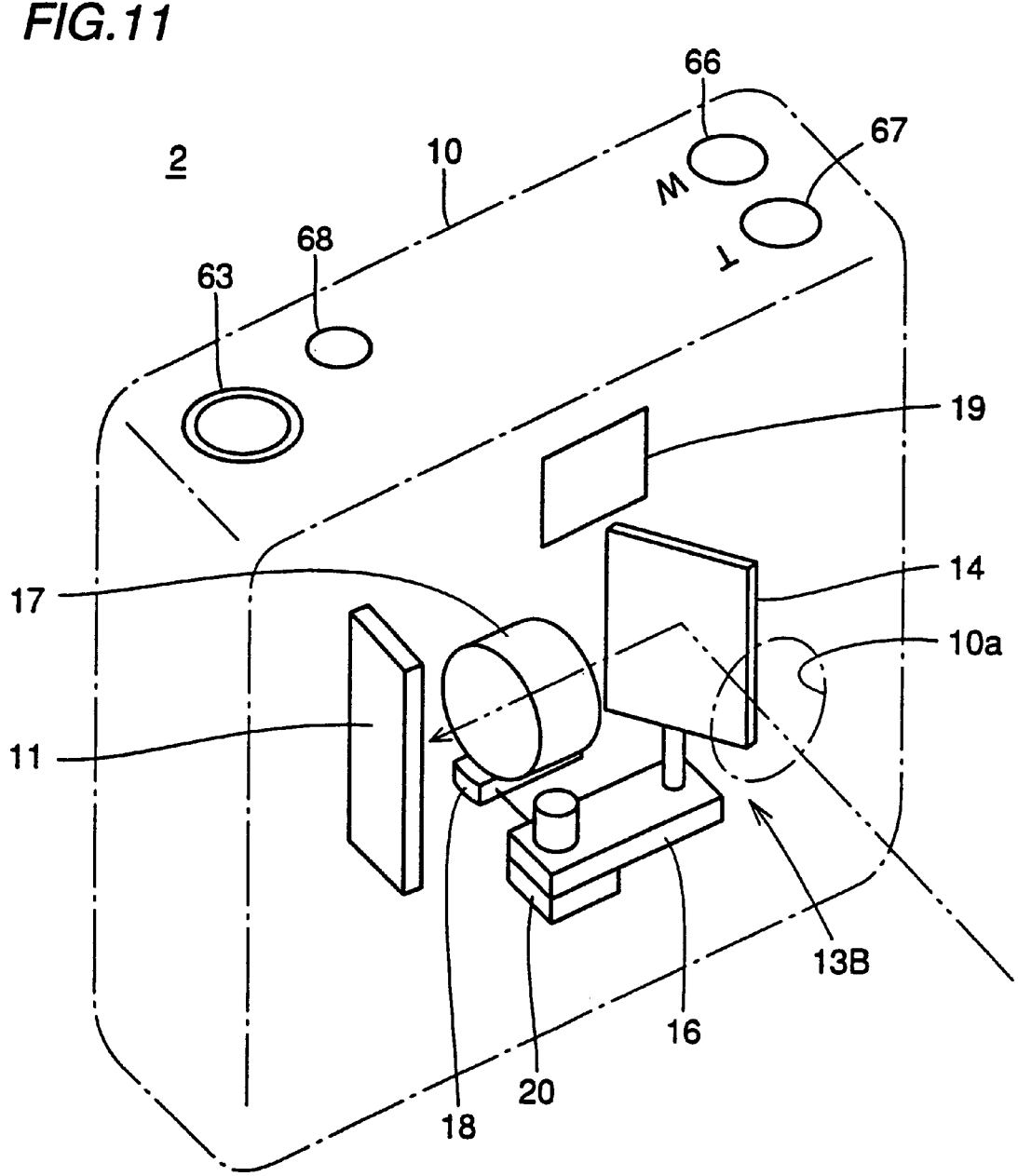
FIG. 11 shows a structure of a line sensor camera according to a second embodiment of the present invention.

FIG. 11 shows a structure of a line sensor camera 2 according to a second embodiment of the present invention. In FIG. 11, components corresponding to those of FIG. 1 have likewise reference characters allotted. The same applies for the following figures.

Line sensor camera 2 is characterized in that variable speed rotation scanning is carried out mechanically to suppress image distortion. The mechanism providing this variable speed rotation scanning is a scan unit 16. More specifically, in line sensor camera 2, a line scanning mechanism 13B is formed of a mirror 14 and a scan unit 16. An actuator (slider drive unit) 20 for modifying the image pickup angle range in the secondary scanning direction in cooperation with zooming is attached to scan unit 16. The remaining structure of the mechanism in line sensor camera 2 are similar to those of the already-described line sensor camera 1.

Figure 12:
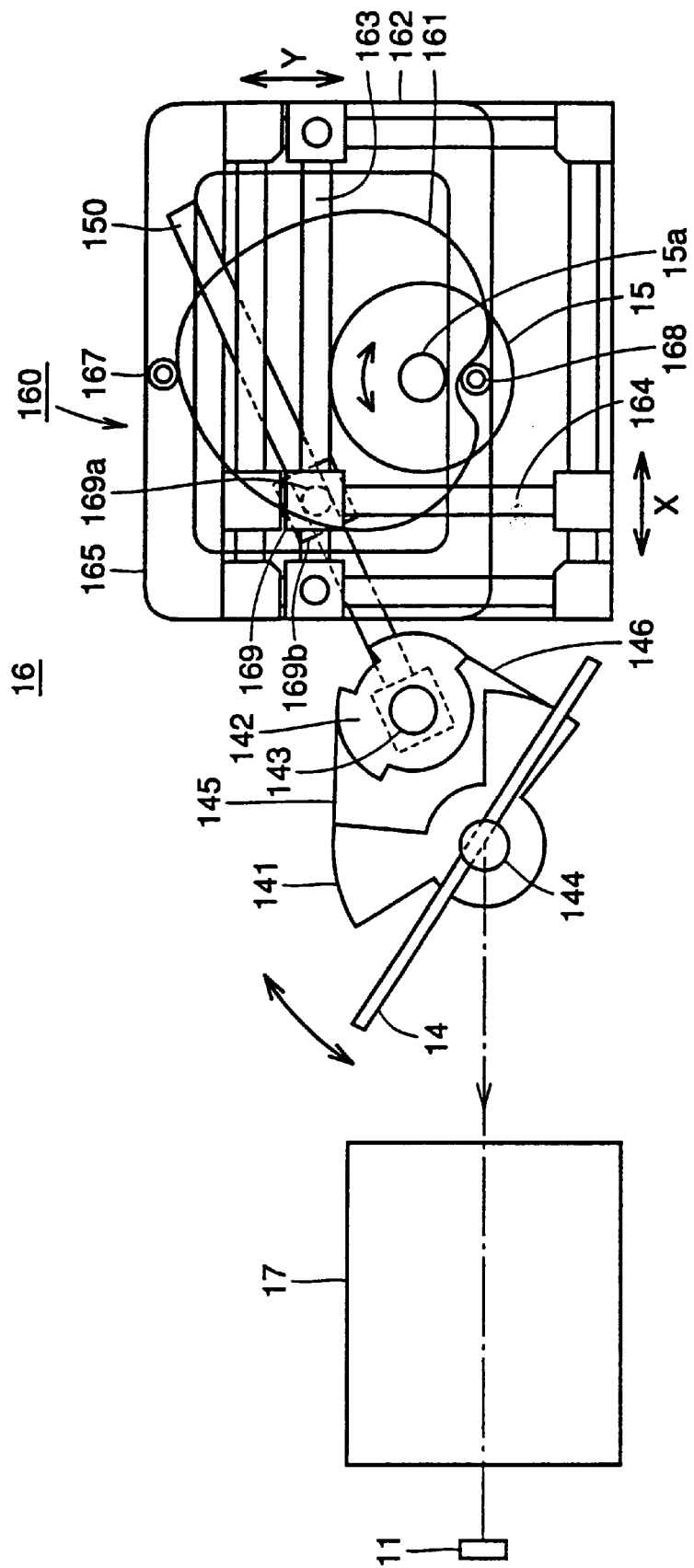
FIG. 12 is a plan view showing a structure of a scan unit.
Figure 13:
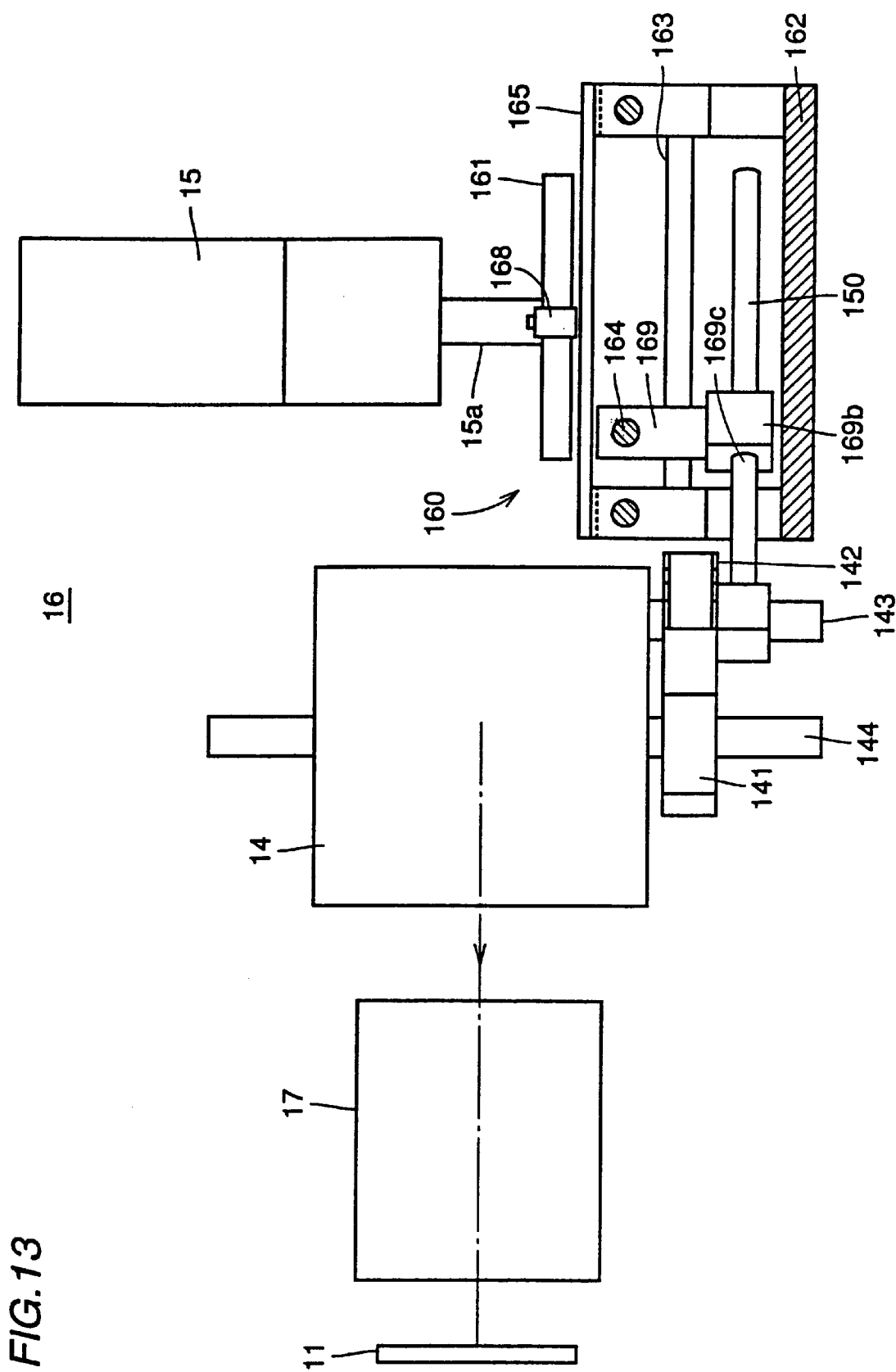
FIG. 13 is a front view of a scan unit.

Referring to FIGS. 12, 13, and 14, scan unit 16 includes a scan motor 15 which is the driving source, a first pulley 141 rotating concentrically with mirror 14, a second pulley 142 having a radius which is ½ that of first pulley 141, a cam mechanism 160 for converting the rotational motion into linear motion, and a lever 150 for propagating the drive force of cam mechanism 160 to second pulley 142. The rotation of second pulley 142 is propagated to first pulley 141 by belts 145 and 146. These pulleys 141 and 142 are partially cut off leaving only the required circumferential portion to reduce the size and weight of the apparatus. Alternatively, a rotational force transmission means of a deacceleration ratio of ½ can be formed using a plurality of gears instead of the combination of the pulley and belt.

Cam mechanism 160 includes a heart-shaped cam 161 that rotates about a drive shaft 15a, an XY table base 162, a Y slider 163 that can be shifted in a Y direction, an X slider 164 that can be shifted in an Y direction, a frame-like driven body 165 fixed to Y slider 163, a pair of rollers 167 and 168 attached to driven body 165 in a rotatable manner, and an XY slider 169 that can be shifted bidirectionally. XY slider 169 includes a block 169b that is provided in a rotatable manner about a shaft 169a along an XY plane. Rollers 167 and 168 are arranged in the Y direction to sandwich cam 161. The movement of Y slider 163 is defined by cam 161. X slider 164 is disposed at a position according to the zooming condition by slider drive unit 20 (refer to FIG. 11).

Lever 150 is inserted in a through hole 169c provided at block 169b of XY slider 169. Lever 150 has one end fixed to a rotation shaft 143 of second pulley 142. The dimension in the direction of the diameter of through hole 169c is set to a value that allows block 169b and lever 150 slide with respect to each other. Lever 150 can move relatively with respect to XY slider 169, and is rotatable about shaft 169a.

In scan unit 16 of the above-described structure, driven body 165 moves back and forth in the Y direction in response to rotation of cam 161. Half a rotation of cam 161 corresponds to a forward drive (or return drive) of driven body 165. The configuration of cam 161 is set so that driven body 165 moves linearly at uniform speed when scan motor 15 is rotated at uniform speed. In the strictest sense, cam 161 is designed to gradually reduce the movement speed at the proximity of the stroke end in order to alleviate the shock at the inversion of the moving direction.

Y slider 163 and XY slider 169 move in the Y direction integrally with driven body 165, whereby lever 150 rotates about shaft 143. Second pulley 142 and first pulley 141 rotates in cooperation with the rotation of lever 150. The angle of rotation of first pulley 141 (the angle of rotation of mirror 114) is ½ the angle of rotation of lever 150 (angle of rotation of second pulley 142). Scan angle θ in the secondary scanning direction is two times the angle of rotation of mirror 14. Therefore, the angle of rotation of lever 150 is equal to scan angle θ.

When XY slider 169 moves at uniform speed, the angular velocity of the rotation of lever 150 is greatest at the middle position of the travel stroke of XY slider 169, and becomes smaller in approaching the stroke end. According to scan unit 16, the rotation speed of scan motor 15 can be maintained at a constant level to allow appropriate change in the rotation speed of mirror 14 during secondary scanning. Therefore, the scanning speed on an object plane can be made constant. Variable speed rotation control of the motor becomes more difficult as the maximum speed increases, whereas uniform speed rotation control of the motor is relatively easy. Therefore, an image can be taken with no distortion by line sensor camera 2 even in the case of high speed image pickup.

Figure 14A:
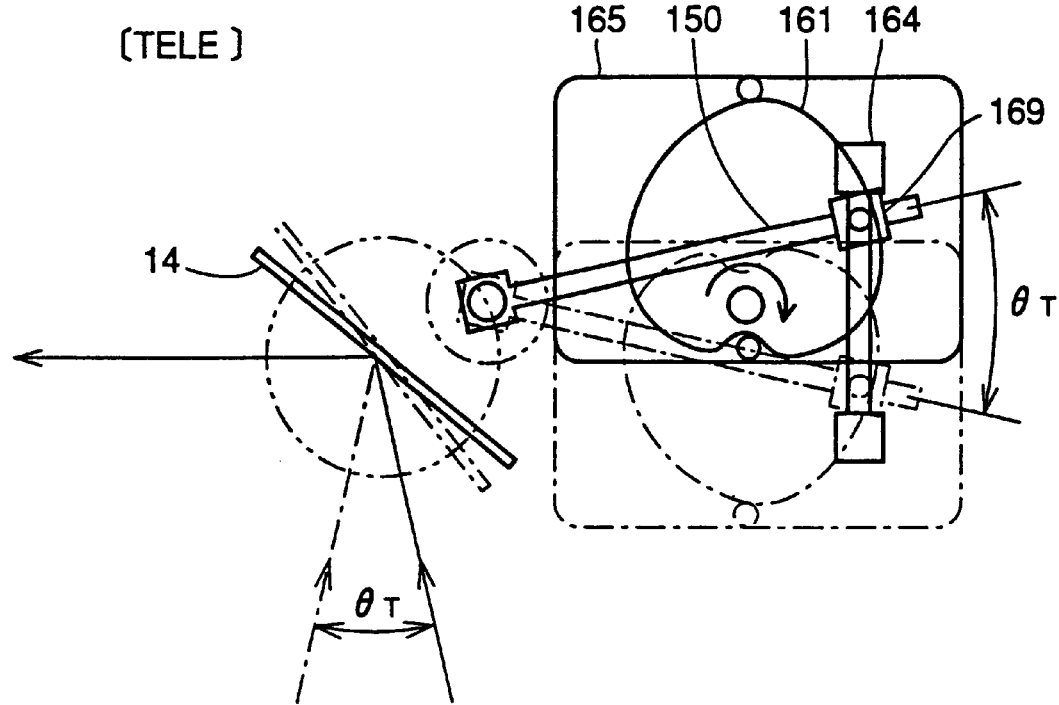
FIGS. 14A and 14B show the feature of a scan unit.
Figure 14B:
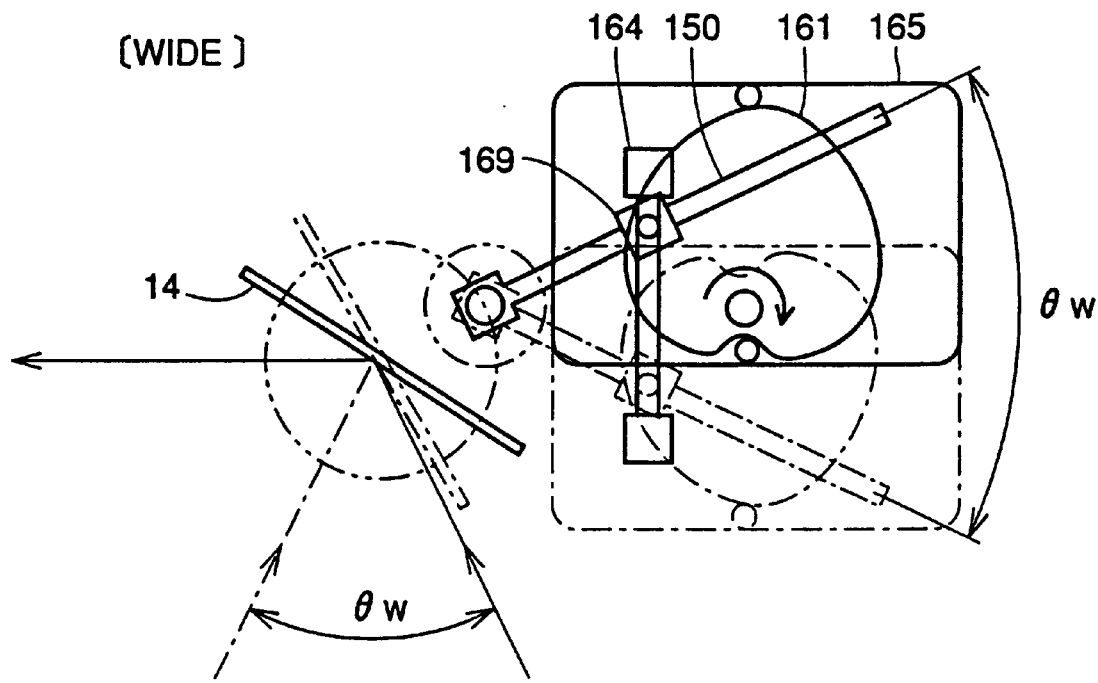

In the telephoto condition shown in FIG. 14A, X slider 164 is located at a position most remote from mirror 14, and lever 150 rotates by an angle $\theta_T$. Therefore, the scan angle θ here is $\theta_T$. In the wide-angle state shown in FIG. 14B, X slider 164 is located closest to mirror 14. Although the stroke length of driven body 165 is equal to that of a telephoto condition, the angle of rotation of lever 150 takes an angle $\theta_W$ that is greater than angle $\theta_T$ since X slider 164 is located closest to mirror 140. The current scan angle θ is $\theta_W$. More specifically, scan angle θ can be altered by moving X slider 164.

Figure 15:
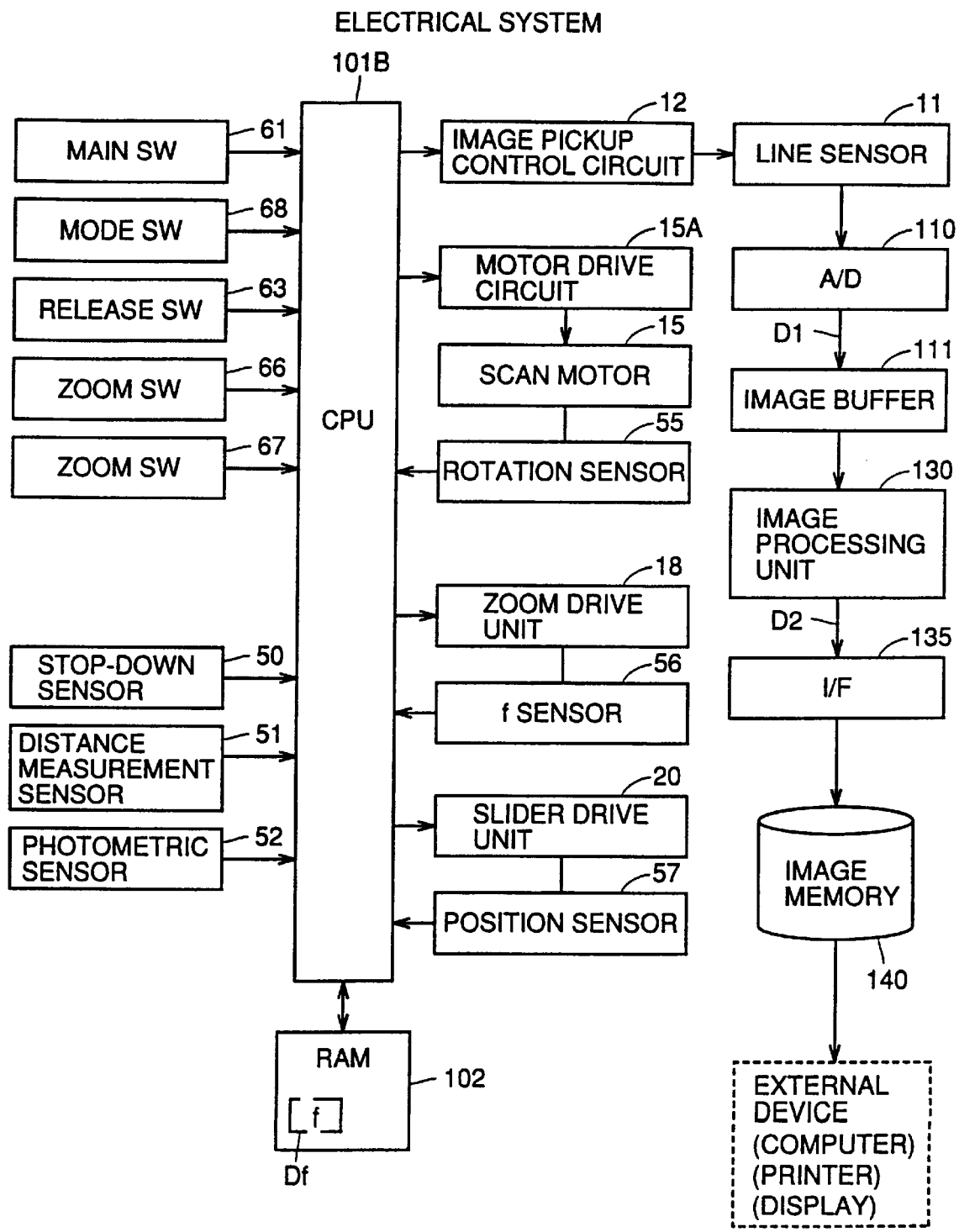
FIG. 15 is a block diagram showing the electrical system of the line sensor camera of FIG. 11.

FIG. 15 is a block diagram of the electrical system of line sensor camera 2 of FIG. 11.

A CPU 101B providing the overall control of line sensor camera 2 has a position sensor 57 connected thereto for detecting the position of X slider 164. CPU 101B provides an instruction for positioning X slider 164 to slider drive unit 20 in zooming.

Figure 16:
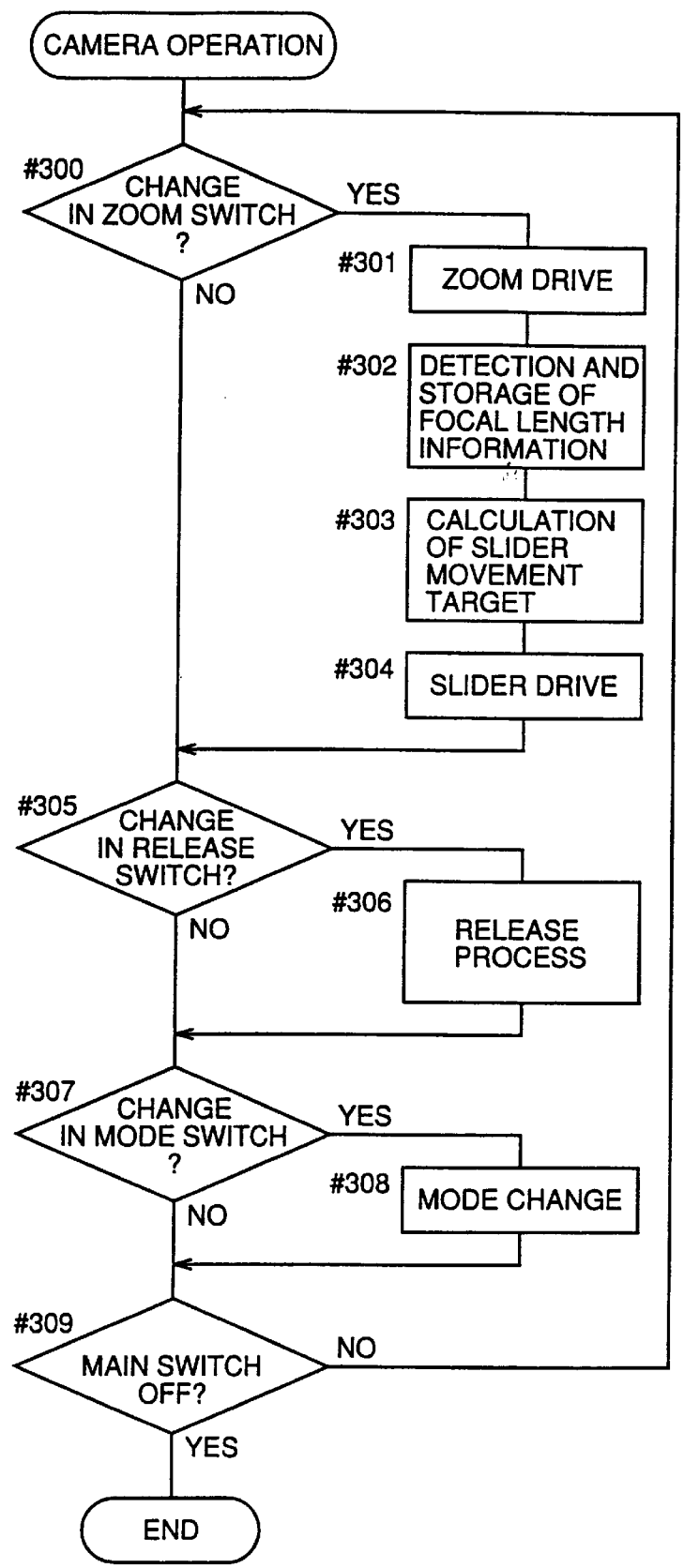
FIG. 16 is a flow chart of the camera operation of the line sensor camera of FIG. 11.

FIG. 16 is a flow chart of a camera operation of line sensor camera 2 of FIG. 11.

CPU 101B carries out a process according to a switch operation under the circumstance that a battery is installed, the control power source is turned on, and main switch 61 is turned on. When zoom switches 66 and 67 are turned on (#300), drive control of actuator 18 is provided (#301). Focal length data Df corresponding to the latest position of the movable portion of zoom unit 17 is stored (#302). The position of X slider 164 of the current zooming condition is calculated (#303). Scan angle θ in the secondary scanning direction is set by controlling slider drive unit 40 while monitoring the output of position sensor 57 (#304).

When release switch 63 is turned on (#305), a release process is carried out to convert the image of the object into image data D2 and storing image data D2 in image memory 140 (#306). When mode switch 68 is turned on (#307), the image pickup mode is switched in a cyclical manner (#308). The transition of the state of each switch is monitored until main switch 61 is turned off (#309, #300).

In the above embodiment, actuator (zoom drive unit) 18 can be mechanically coupled to X slider 164 so that X slider 164 is moved in cooperation with the drive of actuator 18.

The present invention is not limited to the above-described application in which the image pickup angle range is altered according to the zooming condition, i.e. altering the angle range of both the main scanning direction and secondary scanning direction, and can be applied to the case where the so-called panoramatic shooting, i.e. altering (enlarging) the angle range in the secondary scanning direction without altering the angle range in the main scanning direction, is carried out. In this case, the image pickup range in the secondary scanning direction is to be employed instead of focal length distance Df for the parameter in the embodiment shown in FIG. 7. In the embodiment shown in FIG. 11, the position of X slider 164 is to be set according to the image pickup range.

Figure 17:
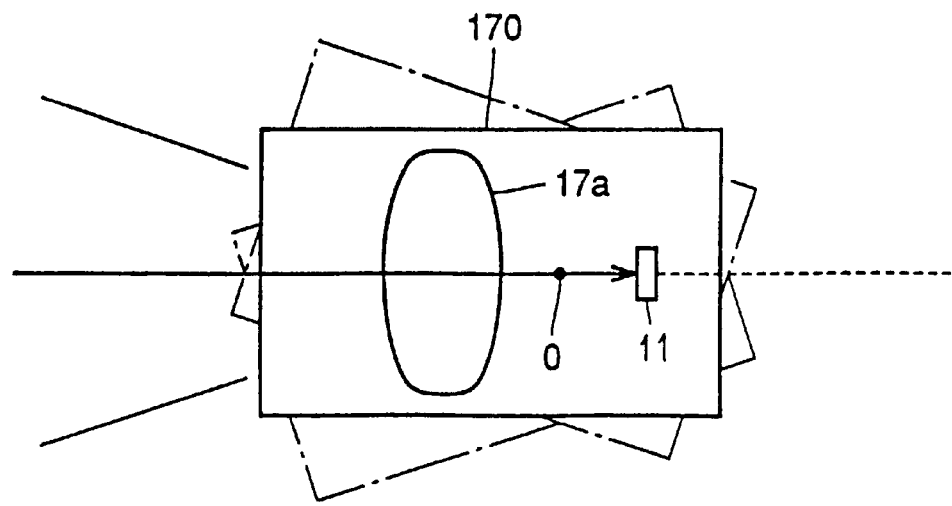
FIG. 17 shows another example of a line scanning mechanism.
Figure 18:
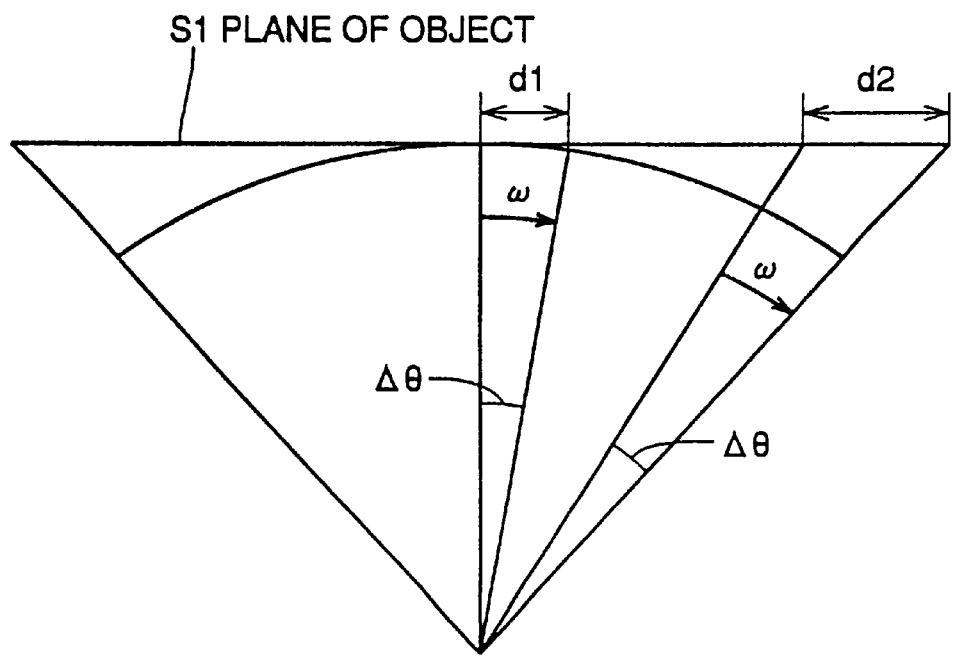
FIG. 18 is a diagram showing the relationship between the angular position and the scanning range in scanning at uniform speed rotation.

In the above-described embodiment, line scanning is carried out by rotating mirror 14. The present invention is also applicable to a line sensor camera of a structure in which the optical axis is moved with respect to an object to be taken in secondary scanning, for example a structure as shown in FIG. 17 in which an imaging unit 170 formed integrally of a lens system 17a and a line sensor 11 is rotated within a predetermined angle range. Although the center of rotation O is located between lens system 17a and line sensor 11 in FIG. 17, the position of the center of rotation O can be located in front of lens system 17a or backward of line sensor 11.

The above embodiment was described in which zoom if units (lens system) 17 and 17a are employed. The present invention is also applicable to an embodiment in which the focal length is modified by exchanging the photographic lens.

(3) Third Embodiment

A line sensor camera according to a third embodiment of the present invention is similar to that of the first embodiment shown in FIG. 1. Likewise description will not be repeated.

According to the third embodiment, distortion in the image is suppressed without using any particular optical component, and without control of a mechanical movable portion.

Figure 19:
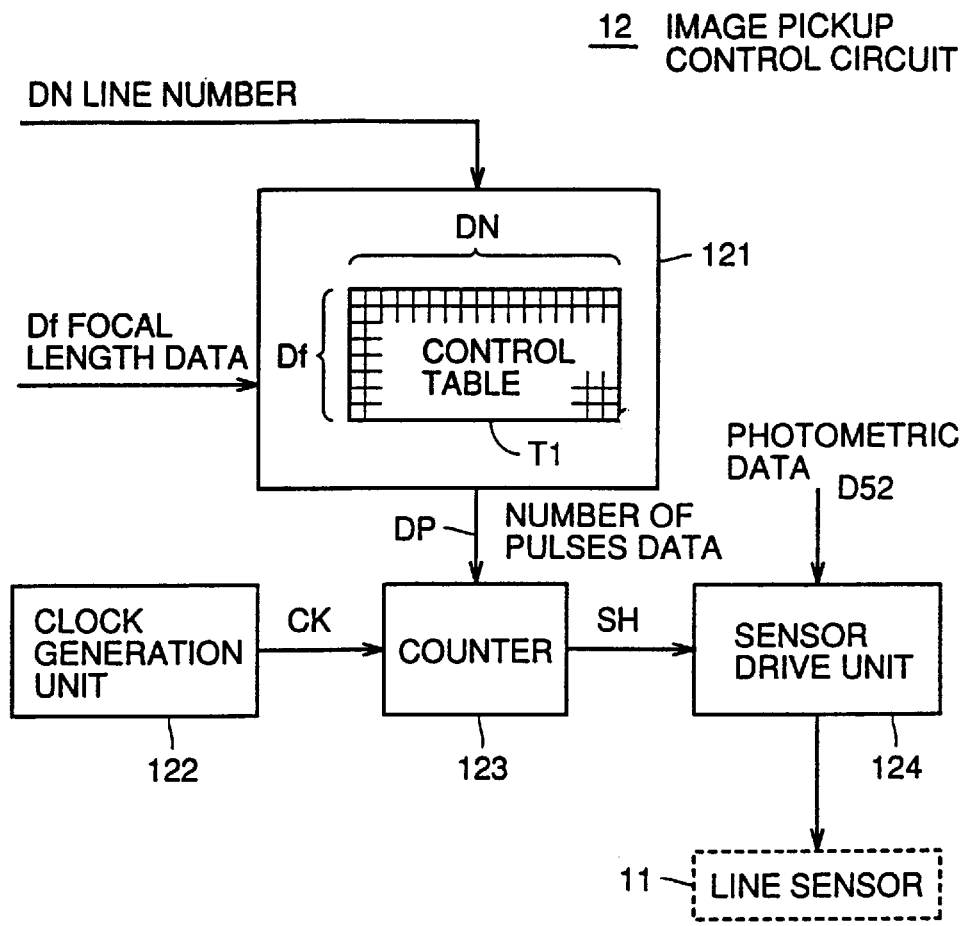
FIG. 19 is a block diagram showing main components of a image pickup control circuit according to a third embodiment of the present invention.
Figure 20:
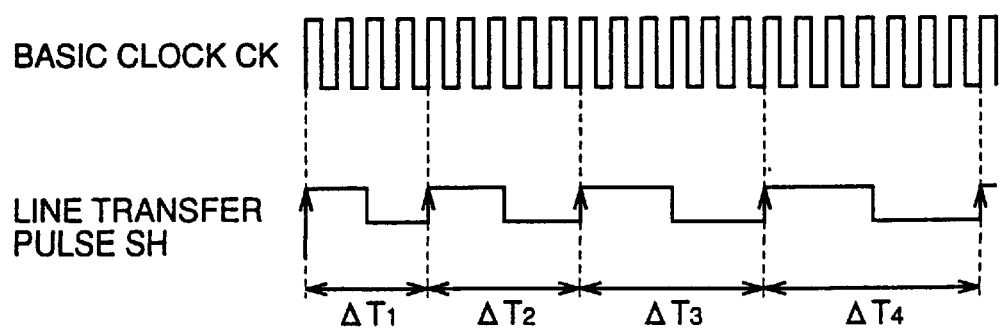
FIG. 20 is a waveform diagram showing an operation of the counter of FIG. 19.

FIG. 19 is a block diagram of the main components of an image pickup control circuit 12 of FIG. 3, and FIG. 20 is a waveform diagram showing the operation of counter 123 of FIG. 19.

Image pickup control circuit 12 includes a memory 121 for storing control table Ti to suppress image distortion, a clock generation unit 122 for generating a basic clock CK, a counter 123 for providing a line transfer pulse SH, and a sensor drive unit 124.

Control table T1 in memory 121 is a group of number of pulses data DP defining the length of line cycle ΔT of each line. The data content is set by CPU 101. A line number DN and focal length data Df are provided to memory 121 from CPU 101. Pulse number data DP addressed by these data is output to counter 123. Line number DN indicates the currently scanning line.

Counter 123 counts the pulses of basic clock CK to output line transfer pulse SH when the count value reaches the value indicated by the number of pulses data DP. Then, the counter value is reset, and a count operation is initiated again. The time starting from a rise of one line transfer pulse SH to the rise of the next line transfer pulse SH is the line cycle ΔT of the current line. The length of line period ΔT is a product of the pulse cycle of the basic clock CK and the value of the number of pulses data DP. Schematically, line cycle ΔT becomes longer as the line number DN ascends during the period after initiation of secondary scanning and until the scanning position arrives at the middle position, and line cycle ΔT becomes shorter as line number DN ascends after the scanning position passes the middle position. As a result, the interval between image pickup lines on the object plane of one line is substantially equal over the entire area of the image pickup angle range in the secondary scanning direction.

Sensor drive unit 124 controls the drive of line sensor 11 in synchronization with line transfer pulse SH. The integration time period (exposure time) of one line is constant independent of the length of line cycle ΔT, and is optimized according to photometric data D52 indicating the photometrical result.

Figure 22:
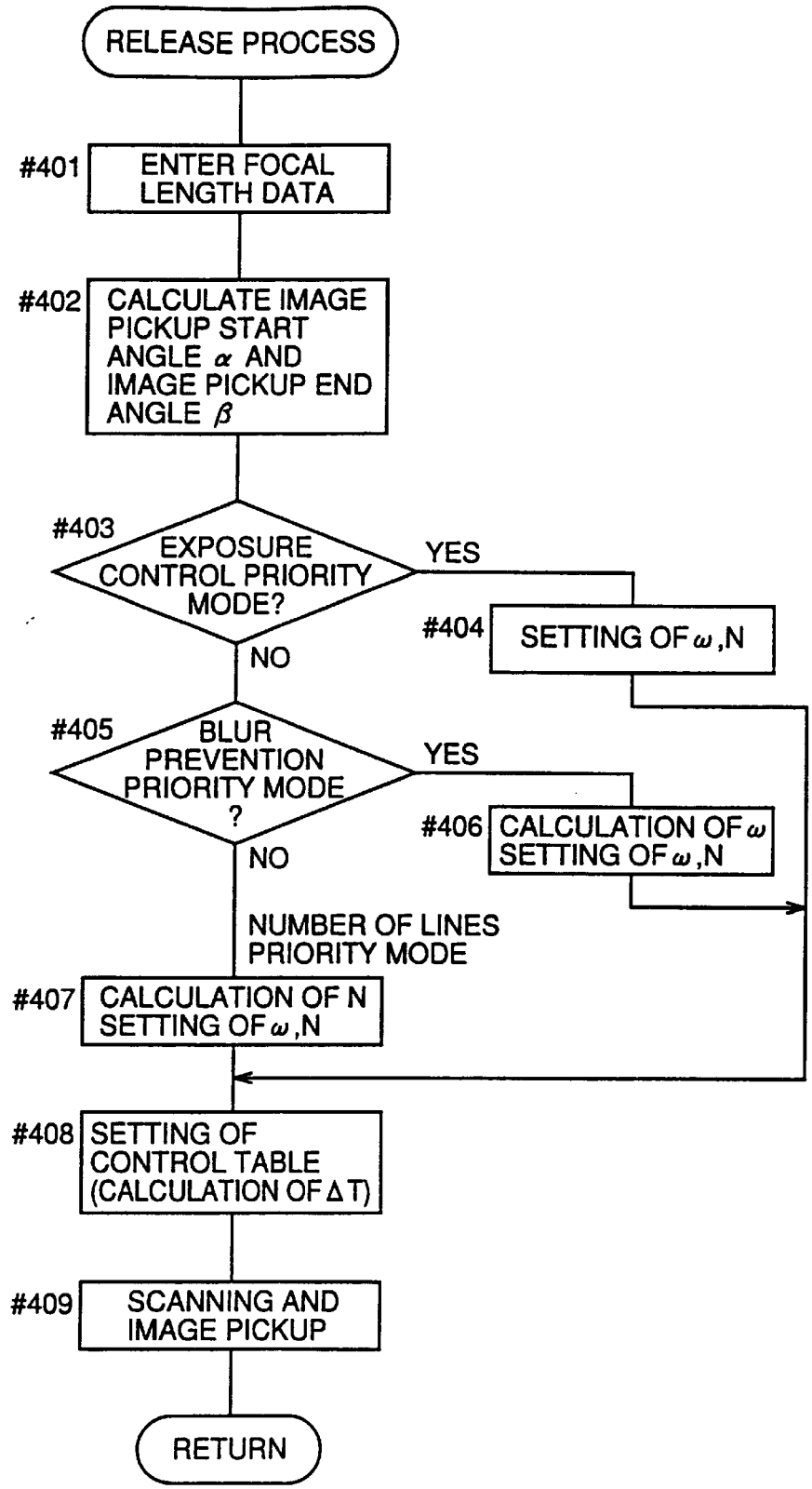
FIG. 22 is a flow chart of a release process according to the third embodiment.

FIGS. 21A–21C are schematic diagrams of the data contents of control tables T1a–T1c, and FIG. 22 is a flow chart for describing the calculation of line cycle ΔT.

In the above-described exposure control priority mode, line cycle ΔT is altered according to the zooming condition. Therefore, control table T1a for the exposure control priority mode is formed of a pulse number group in which the value differs according to the line number and in which the value also differs according to focal length data Df, as shown in FIG. 21A. Since line cycle ΔT is constant in a blur prevention priority mode, control table T1b of this mode is formed of a pulse number data group in which the value differs according to the line number, and in which the value is identical independent of focal length data Df if of the same line, as shown in FIG. 21B. In a number of lines priority mode, the number of lines N is altered, but line cycle ΔT is constant. Therefore, control table T1c of the number of lines priority mode is formed of a pulse number data group in which the value differs according to the line number, and in which the value is identical independent of focal length data Df as for the line of the same position. Although FIGS. 21A–21C illustrate 5 stages of focal length data Df, the number of stages of focal length data Df is greater than 5, for example, 20, in practice. Also, since the data values of the former half and latter half of the row of line numbers duplicate each other, it is possible to store only the pulse number data for the former half of the line number row to commonly share one pulse number data for two lines. For example, the data of the first line can be applied for the last line.

The value of number of pulses data DP of control table T1 is selected so that the image pickup range on the object plane for one line is substantially equal over the entire area of the image pickup angle range in the secondary scanning direction. More specifically, when the distance between the center of rotation O of secondary scanning and object plane S1 is r and the angle between the center direction of the image pickup angle range and the scanning direction of the time point of interest is δ as shown in FIG. 8, scanning speed V on object plane S1 is represented by the following equation (5).

$$V = r \times \omega / \cos^2 \delta \qquad (5)$$

Image pickup time T of one screen is the product of line cycle ΔT (strictly, an average value of ΔT) and the number of lines N [equation (6)]. Also, image pickup distance H of one screen on object plane S1 is the product of scanning speed V and image pickup time T of one screen [equation (7)].

$$T = \Delta T \times N \quad (6)$$

$$H = V \times T \quad (7)$$

When the angle between the scanning direction at the time point of initiating secondary scanning and the center direction of the image pickup angle range is $\delta_0$, line cycle $\Delta T$ is expressed by the following equation (8) using time t (i.e. line number).

$$\Delta T = \frac{H}{V \cdot N} = \frac{H}{r} \times \frac{1}{\omega \cdot N} \cos^2 \delta = \frac{H}{r} \times \frac{1}{\omega \cdot N} \cos^2(\omega \cdot t - \delta_0) \quad (8)$$

The value of number of pulse data DP is calculated using equation (8). Distance is calculated according to an output of distance measurement sensor 51. Image pickup distance H is determined according to distance r and scan angle θ (altered according to zooming condition).

FIG. 22 is a flow chart of the release process of FIG. 9 in the third embodiment.

As the process of increasing/decreasing scan angle θ according to the focal length distance (magnification) so that a constant aspect ratio of the photo image is maintained, focal length data Df is entered to calculate image pickup start angle a and image pick end angle β (#401, #402).

Then, rotation speed ω and number of lines N are set according to the image pickup mode. Also, the value of focal length data Df is set according to the output of f sensor 56 (#403–#407). In setting these parameters, rotation speed ω corresponding to focal length data Df is calculated when in a blur prevention priority mode, and number of lines N corresponding to focal length data Df is calculated when in the number of lines priority mode.

Then, line cycle $\Delta T$ of each line corresponding to focal length data Df is calculated to generate number of pulses data DP. Number of pulses data DP is set in control table T1 (#408). Number of pulses data DP is read out in the line number order from control table T1 to pick up one screen while altering line cycle $\Delta T$ (#409). Alternatively, the angular position of mirror 14 can be specified instead of the line number to read out the number of pulses data DP from control table T1. The angular position of mirror 14 can be calculated according to the scan start angle, angular velocity, and the elapsed time since scanning has begun. Furthermore, a parameter value suitable for focal length data Df can be prestored in a ROM and the like to read out the stored parameter values therefrom at #403–#407.

The present invention is not limited to the above-described application in which the image pickup angle range is altered according to zooming, i.e. angle range is altered in both the main scanning direction and the secondary scanning direction, the present invention is also applicable to the case where the so-called panoramatic shooting is carried out, i.e. the case where the angle range in the main scanning direction is not altered and the angle range in the secondary scanning direction is altered (enlarged). In this case, the image pickup range in the secondary scanning direction is to be employed instead of the focal length data Df which is the parameter in FIG. 21.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera comprising:

a photographic lens, a line sensor for scanning in a main scanning direction an image of an object which passes through said photographic lens, means for scanning said image in a secondary scanning direction, means for deciding a focal length of said photographic lens, means for selecting, according to the decided focal length, a relationship between an angular velocity of said secondary scanning and an angle of said secondary scanning, and means for altering, according to the selected relationship, angular velocity of said secondary scanning in proportion to an angle of said secondary scanning.

2. The camera according to claim 1, further comprising:

means for modifying an image pickup range in said secondary scanning direction according to the decided focal length, wherein the alternation does not change the time required for secondary scanning of said image pickup range, independently of modification of said image pickup range.

3. The camera according to claim 1, wherein the scanning is carried out by rotating a mirror.

4. The camera according to claim 1, wherein the alteration is decreasing the angular velocity of scanning at both end portions of a scanning range relative to the angular velocity of secondary scanning at a center portion of the scanning range.

5. A camera comprising:

a photographic lens, a line sensor for scanning in a main scanning direction an image of an object which passes through said photographic lens, rotational scanning means which pivotally scans said image in a secondary scanning direction, drive means rotating at uniform speed to drive said rotational scanning means, and drive transmission mechanism for mechanically altering the uniform rotation of said drive means according to an angle of said secondary scanning and transmitting the altered rotation to said rotational scanning means.

6. The camera according to claim 5, wherein said drive transmission mechanism includes a cam.

7. The camera according to claim 2, wherein the scanning is carried out by rotating a mirror.

8. The camera according to claim 5, further comprising modify means for modifying a focal length of said photographic lens, wherein said drive transmission means alters and transmits to said rotational scanning means the uniform rotation of said drive means according to an angle of said secondary scanning and said focal length.

9. The camera according to claim 5, wherein said drive transmission means decreases the rotation speed of secondary scanning at both end portions of the image pickup range relative to a rotation speed of said rotational scanning means in secondary scanning of the center portion of the image pickup range.

10. A camera comprising:
a line sensor for scanning an object in a main scanning direction,
means for rotating an image of said object relative to said line sensor in a secondary scanning direction,
means for deciding a rotation range of said secondary scanning,
means for selecting, according to the decided rotation range, a relationship between an angular velocity of said secondary scanning and an anile of said secondary scanning, and
means for altering, according to selected relationship, angular velocity of said secondary scanning in proportion to an angel of said secondary scanning.

11. The camera according to claim 10, wherein the scanning is carried out by rotating a mirror.

12. The camera according to claim 10, wherein the alteration does not change the time required for secondary scanning of the rotation range, independently of modification of said rotation range.

13. The camera according to claim 10, wherein the alteration is decreasing the angular velocity of secondary scanning at both end portions of the rotation range relative to the angular velocity of secondary scanning at a center portion of the rotation range.

14. A camera comprising:
a photographic lens through which an image of an object passes,
a line sensor for scanning in a main scanning direction an image which passes through said photographic lens,
rotational scanning means for scanning said image in a secondary scanning direction,
modify means for modifying a focal length of said photographic lens, and
image pickup control means for modifying an image pickup cycle of secondary scanning according to an angle of said secondary scanning and said focal length.

15. The camera according to claim 14, wherein said rotation scanning means rotates a mirror.

16. The camera according to claim 14, wherein said image pickup control means reduces the image pickup cycle of secondary scanning at both end portions of the image pickup range relative to the image pickup cycle of secondary scanning at the center portion of the image pickup range.

17. The camera according to claim 1, further comprising
means for modifying an image pickup range in said secondary scanning direction according to the decided focal length,
wherein an image pickup range of one line of said line sensor is equal over an entire area of said image pickup range.

18. The camera according to claim 5,
wherein said drive transmission mechanism alters said uniform rotation so that an image pickup range of one line of said line sensor is equal over an entire area of said image pickup range.

19. The camera of claim 14 wherein said image pickup control means modifies an image pickup cycle so that a distance interval between image pickup lines of said line sensor is equal over an entire area of said image pickup range.

20. A camera comprising:
a photographic lens through which an image of an object passes,
a line sensor for scanning in a main scanning direction an image which passes through said photographic lens,
rotational scanning means for scanning said image in a secondary scanning direction,
modify means for altering an image pickup range of said secondary scanning direction, and
image pickup control means for modifying an image pickup cycle of secondary scanning according to an angle of said secondary scanning and said image pickup range.

21. A camera comprising:
a photographic lens through which an image of an object passes,
a line sensor for scanning in a main scanning direction an image which passes through said photographic lens,
means for scanning said image in a secondary scanning direction,
means for deciding a focal length of said photographic lens,
means for selecting a relationship, regardless of the decided focal length, between an angular velocity of said secondary scanning and an angle of said secondary scanning, and
means for altering, according to the selected relationship, angular velocity of said secondary scanning in proportion to an angle of said secondary scanning.

22. A camera comprising:
a line sensor for scanning an object in a main scanning direction,
means for rotating an image of said object relative to said line sensor in a secondary scanning direction,
means for deciding a rotation range of said secondary scanning,
means for selecting, regardless of the decided rotation range, a relationship between an angular velocity of said secondary scanning and an angle of said secondary scanning, and
means for altering, according to the selected relationship, angular velocity of said secondary scanning in proportion to an angle of said secondary scanning.

23. A camera comprising:
a photographic lens through which an image of an object passes,
a line sensor for scanning in a main scanning direction an image which passes through said photographic lens,
rotational scanning means for scanning said image in a secondary scanning direction,
modify means for modifying a focal length of said photographic lens, and
image pickup control means for modifying an image pickup cycle of secondary scanning according to an angle of said secondary scanning regardless of said focal length.

24. A camera comprising:
a line sensor for scanning an object in a main scanning direction,
rotational scanning means for rotating an image of said object relative to said line sensor in a secondary scanning direction,
image pickup range modify means for altering an image pickup range of said secondary scanning direction, and
image pickup control means for modifying an image pickup cycle of secondary scanning according to an angle of said secondary scanning regardless of said image pickup range.

* * * * *